United States Patent
Gentil

(10) Patent No.: US 10,143,907 B2
(45) Date of Patent: Dec. 4, 2018

(54) PLANAR SOLUTIONS TO OBJECT-TRACKING PROBLEMS

(71) Applicant: Gregoire Alexandre Gentil, Palo Alto, CA (US)

(72) Inventor: Gregoire Alexandre Gentil, Palo Alto, CA (US)

(73) Assignee: Gregoire Gentil, Palo Alto, CA (US)

( * ) Notice: Subject to any disclaimer, the term of this patent is extended or adjusted under 35 U.S.C. 154(b) by 169 days.

(21) Appl. No.: 15/370,993

(22) Filed: Dec. 6, 2016

(65) Prior Publication Data

US 2018/0154232 A1    Jun. 7, 2018

Related U.S. Application Data

(60) Provisional application No. 62/265,392, filed on Dec. 9, 2015.

(51) Int. Cl.
*A63B 71/06*     (2006.01)
*H04N 21/218*    (2011.01)
(Continued)

(52) U.S. Cl.
CPC ........ *A63B 71/0605* (2013.01); *A63B 63/007* (2013.01); *A63B 69/38* (2013.01); *H04N 7/181* (2013.01); *H04N 21/21805* (2013.01); *A63B 2024/0043* (2013.01); *A63B 2071/0611* (2013.01); *G06T 2207/10016* (2013.01); *G06T 2207/30224* (2013.01)

(58) Field of Classification Search
CPC ........ A63B 2071/0611; A63B 71/0605; A63B 2102/02; A63B 2024/0043; A63C 19/065
See application file for complete search history.

(56) References Cited

U.S. PATENT DOCUMENTS 4,866,414 A * 9/1989 Diaconu ............ A63B 71/0605
                                                340/323 R
5,059,944 A * 10/1991 Carmona ........... A63B 71/0605
                                                340/323 R
(Continued)

FOREIGN PATENT DOCUMENTS

DE          19954504 A1 *  6/2000  ......... A63B 71/0605
EP          2455911 A1 *   5/2012  ......... A63B 71/0605

*Primary Examiner* — John Villecco

(57) ABSTRACT

The present invention overcomes deficiencies of existing line-calling devices by leveraging a single fixed-location camera to identify object state conditions that resolve object-tracking problems that otherwise require multi-camera or moving-camera solutions. Though described in the context of an automated tennis line-calling device, the invention is equally applicable to other object-tracking problems that can be resolved by identifying object state conditions without employing moving or multiple cameras. The tennis line-calling device is attached to (or at least located in proximity to) the net post of a tennis court, thereby enabling a "close-up" view of both static (court lines) and moving (ball, players, etc.) objects. In one embodiment, integration of a video camera system with line-calling functionality provides additional benefits, including attachment of a single turnkey device to any tennis net post so as to provide automated line-calling functionality without the need for any external video cameras or processing functionality.

4 Claims, 19 Drawing Sheets

(51) Int. Cl.
*A63B 69/38* (2006.01)
*H04N 7/18* (2006.01)
*A63B 63/00* (2006.01)
*A63B 24/00* (2006.01)

(56) References Cited

U.S. PATENT DOCUMENTS

| | | | | |
|---|---|---|---|---|
| 5,489,886 A * | 2/1996 | Wexler | ............... | A63B 71/0605 340/323 R |
| 5,800,292 A * | 9/1998 | Brace | ................. | A63B 71/0605 473/467 |
| 6,024,658 A * | 2/2000 | Marshall | ........... | A63B 71/0605 473/467 |
| 6,816,185 B2 * | 11/2004 | Harmath | ........... | A63B 71/0605 340/323 R |
| 8,152,389 B1 * | 4/2012 | Lammens | .............. | F16M 11/10 396/419 |
| 8,189,857 B2 * | 5/2012 | Johnson | ............ | A63B 71/0605 382/100 |
| 8,199,199 B1 * | 6/2012 | Shlyak | ............ | A63B 71/0605 348/157 |
| 8,348,276 B2 * | 1/2013 | Brennan | ............ | A63B 24/0003 273/118 R |
| 9,036,864 B2 * | 5/2015 | Johnson | .................... | G06T 7/20 382/103 |
| 9,737,784 B1 * | 8/2017 | Kliebhan | ........... | A63B 71/0605 |
| 9,953,424 B2 * | 4/2018 | Simon Vilar | .............. | G06T 7/20 |
| 9,989,352 B2 * | 6/2018 | Coleman | ............... | G01B 11/002 |
| 9,999,825 B2 * | 6/2018 | Shachar | .................... | G06T 7/20 |
| 2004/0185952 A1 * | 9/2004 | Marshall | ............ | A63B 71/0605 473/151 |
| 2006/0252017 A1 * | 11/2006 | Vorozhtsov | ........ | A63B 24/0006 434/247 |
| 2007/0064975 A1 * | 3/2007 | Takanohashi | ........... | H04N 5/144 382/103 |
| 2007/0092158 A1 * | 4/2007 | Miyamori | ................. | G06T 7/20 382/276 |
| 2012/0154593 A1 * | 6/2012 | Anderson | .............. | H04N 5/222 348/157 |
| 2017/0213087 A1 * | 7/2017 | Chen | ....................... | G06T 7/248 |
| 2017/0368439 A1 * | 12/2017 | Khazanov | .............. | A63B 69/40 |
| 2018/0005049 A1 * | 1/2018 | Dodd | ................. | G06K 9/00791 |

* cited by examiner

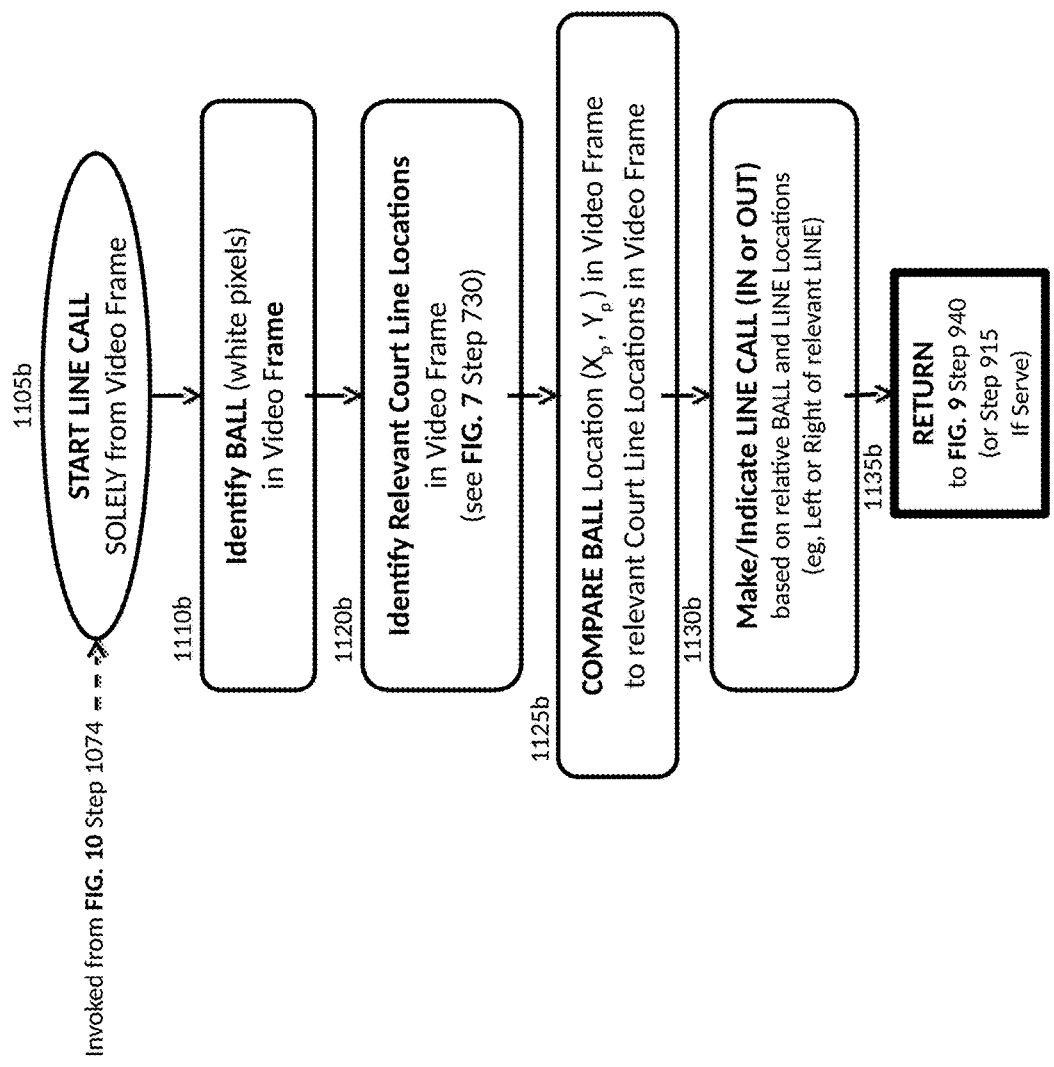

PLANAR SOLUTIONS TO OBJECT-TRACKING PROBLEMS

CROSS-REFERENCE TO RELATED APPLICATIONS

This application claims the benefit, pursuant to 35 U.S.C. § 119(e), of U.S. Provisional Patent Application No. 62/265,392, filed Dec. 9, 2015, entitled "Sports apparatus to locate a ball and provide feed-back to players: Application to Tennis," which is incorporated herein by reference.

BACKGROUND

Field of Art

The present invention relates generally to the field of computer vision, and in particular to leveraging the object-tracking capabilities of a single fixed-location camera to identify object state conditions that yield planar solutions to certain 3D object-tracking problems. The invention illustrates a tennis line-calling scenario with a portable, integrated, standalone auto-calibrating device that is easy to set up in seconds attached (or in close proximity) to a tennis net post.

Description of Related Art

It is generally understood in the field of computer vision that multiple cameras enable the extraction of 3D information (including relative depth information) from digital images. For example, the precise location of an object in 3D space can be determined by applying the process of "stereo photography" to the images generated by two or more displaced cameras (analogous to the operation of human "binocular vision")—after accounting for lens distortion, noise and other related factors. Similarly, multiple video cameras can be employed to track the trajectory of moving objects as they travel through 3D space. [See, e.g., Wikipedia articles on "Computer stereo vision," "Triangulation" and "Video tracking."]

Because 3D object-tracking scenarios often involve fast-moving objects, real-time decision-making capabilities are frequently required. While single-camera object-tracking approaches have been explored (see, e.g., U.S. Pat. App. Pub. No. US/2002/0094135, "Computer Vision in Sports," Moeslund et al, Springer 2014, Chapter 2, and "Supporting the Tennis Coach: Automatically Analyzing and Evaluating Tennis Footage," Marc Kuijpers, Master's thesis, Delft University of Technology, Oct. 13, 2010), such solutions tend to rely either on a single moving camera or on advance knowledge of object or camera trajectories. Moreover, they are mostly tailored to post-event analysis and video annotation of recorded "behind-the-player" televised video, which has an entirely different set of objectives and constraints from object tracking and real-time decision making.

Because real-time decision-making in 3D object-tracking scenarios does not universally lend itself to single-camera solutions, multi-camera and moving-camera solutions are most often preferred. Consider, for example, the recent emergence of self-driving vehicles, which employ multiple cameras, lasers, sonar and radar devices and various other sensors. Even "assisted-driving" vehicles which are less than fully autonomous address a host of real-time object-tracking and decision-making problems including, for example, tracking nearby pedestrians, vehicles and other objects, recognizing stop signs and colored traffic signals, and making virtually instantaneous decisions to turn, stop, accelerate or decelerate the vehicle.

Professional sports, such as tennis, have also employed systems with multiple cameras to address the problem of tracking fast-moving objects in 3D space (e.g., a tennis ball) and making real-time decisions (e.g., line calls). Of course, other sports (baseball, football, basketball, ice hockey, soccer, cricket, squash, handball, racquetball, pickleball, volleyball, badminton, etc.) and activities present similar problems.

Yet, multi-camera solutions can be impractical from both a time and cost perspective, often imposing extensive advance setup, maintenance and operating obstacles. For example, in the field of professional tennis, the "HAWK-EYE"™ system has been employed by the ITF (International Tennis Federation) since 2006 to confirm or overrule certain line-call decisions made by chair and line umpires.

This HAWK-EYE™ system 100a, illustrated in FIG. 1A, includes a number of video cameras 110a placed in fixed locations above and around a tennis court 120a. These video cameras 110a enable a complete view (from multiple different angles and perspectives) of the tennis court 120a (including the court lines, net, etc.) and surrounding area, as well as moving objects such as players 122a (and their racquets) and, of course, the tennis ball 125a. In addition to the video cameras 110a, system 100a also includes external processing devices 116a with human supervision and intervention to make line-call decisions based upon input from the video cameras 110a (e.g., by employing 3D triangulation to track the trajectory of the ball), and a video display screen 117a to display a graphic visualization of the results of such decisions.

Though considered very accurate, the cost of the HAWK-EYE™ system 100a is extremely high—in the $50,000-$100,000 range per court—thereby limiting its utility to high-end professional tennis venues that can afford not only this initial cost, but the extensive associated installation, setup, maintenance and operating costs. Moreover, system 100a is not fully automated, as it requires human operators to perform certain of its functions. Nevertheless, the HAWK-EYE™ system 100a is currently deployed or under development for use in certain other sports, such as cricket, Australian football, Gaelic football and hurling.

To address the limited utility of the HAWK-EYE™ system, an Israeli company, "PlaySight Interactive Ltd.," recently developed a similar, but lower-cost, "Smart-Court"™ system designed to be more automated and usable by tennis players. In addition to its lower cost (roughly $20,000 per court plus a monthly fee), it is focused on a variety of features beyond automated line-calling and instant replay, including analysis of strokes, tactics and player statistics. These additional features expand its market reach to a wide variety of other sports and activities where interactive analysis is desired.

Similar to the HAWK-EYE™ system 100a, the PLAYSIGHT® (SmartCourt™) system 100b, illustrated in FIG. 1B, also includes multiple video cameras 110b placed in fixed locations above and around a tennis court 120b. These video cameras 110b similarly enable a complete view (from multiple different angles and perspectives) of the tennis court 120b (including the court lines, net, etc.) and surrounding area, as well as moving objects such as players 122b (and their racquets) and, of course, the tennis ball 125b. In addition to the video cameras 110b, system 100b also includes an external interactive kiosk 115b that includes both a processing device 116b to make automated line-call decisions based upon input from the video cameras 110b (e.g., by employing 3D triangulation to track the trajectory of the ball), and a video display screen 117b to display a graphic visualization of the results of such decisions.

By combining the processing device 116b and the video display screen 117b into a single integrated kiosk 115b, system 100b enables players 122b and others (e.g., coaches and friends) to obtain not only real-time line calls and instant replays, but also extensive interactive feedback and analysis of their game, both during and after matches or practice sessions. In addition, system 100b includes network and Internet connectivity 118b to enable players and others to share and interact with the results of the recorded video and perform detailed statistical and visual analyses, both on the court (e.g., via a smartphone, tablet, laptop, etc.) and remotely (e.g., over the Internet, including via social media, to a computer at home).

Yet, both the HAWK-EYE™ system 100a and PLAY-SIGHT® (SmartCourt™) system 100b retain significant limitations that limit their market to professional or high-end venues. Multiple cameras must be installed in fixed locations, external to the devices that implement the system's real-time decision-making functionality. Substantial setup and maintenance is required, even apart from the up-front costs.

Thus, there is a need for a much lower-cost automated solution that can address these problems for smaller venues (e.g., public tennis courts, small tennis clubs, etc.) and even individuals. Such a solution could also be applied beyond tennis to other sports and activities, and essentially to any 3D object-tracking scenario requiring decisions relating to the actual or relative locations of moving and static objects.

Consider, for example, the similarities between the real-time decisions required by the self-driving vehicle and tennis line-calling scenarios referenced above (independent of the issue of whether a multi-camera or moving-camera approach is cost-prohibitive or otherwise impractical). In both scenarios, multiple cameras are employed to detect and track moving objects (e.g., pedestrians crossing a street, or tennis players moving across a court as well as the ball they hit back and forth over the net) and identify conditions requiring real-time decisions (e.g., a yellow traffic light requiring the vehicle to make a deceleration decision, or a yellow tennis ball bouncing on a court requiring a line-call decision).

In both scenarios, the question arises as to whether a single-camera approach is sufficient to enable an automated real-time decision, despite the general inability of a single camera from a fixed location to track precise trajectories of objects moving through 3D space. As will be explained below, the answer provided by the present invention lies in its ability to leverage a single fixed-location camera to identify "object state conditions" that effectively transform a 3D object-tracking problem that otherwise would require a multi-camera or moving-camera solution into a 2D planar problem that can be solved by relying upon video frames generated by a single fixed-location camera.

To illustrate these object state conditions, consider the multi-camera approach currently employed by existing tennis line-calling systems (such as the HAWK-EYE™ and PLAYSIGHT® SmartCourt™ systems), illustrated in flowchart 100c in FIG. 1C. Starting at step 110c at the beginning of each point in a tennis match, these systems generate successive "video frames" from each of the multiple video cameras in step 120c. For example, high-speed video cameras might generate a single high-resolution video frame at a very high frame rate. To address lens curvature, lighting conditions, video noise and other related factors, these systems perform "image adjustments" in step 130c to facilitate accurate identification of both moving and static objects in each video frame.

In step 140c, these systems identify the tennis ball in the "snapshot" video frame generated by each camera at a given moment in time. In step 150c, these systems leverage the fact that, at each moment in time, each of the multiple cameras generates a video frame from its "perspective" at its known fixed location. Employing standard 3D triangulation methods (and perhaps also relying on information obtained from previously generated video frames) in step 150c, these systems calculate the precise location of the tennis ball in 3D space.

Note, however, that knowledge of this precise 3D ball location does not necessarily trigger the need for the ultimate line-calling decision (i.e., because line calls cannot be made until the moment when the ball first impacts or bounces on the surface of the tennis court). So, in step 155c, these systems determine whether a ball bounce has occurred. Yet, given the precise 3D ball location (e.g., in a standard X-Y-Z coordinate system) previously calculated in step 150c, this process is trivial—i.e., simply checking whether Z=0, indicating that the height of the tennis ball is 0, and has thus first bounced on the surface of the tennis court. If not, these systems return to step 120c to generate the next set of video frames at the next moment in time. It should be noted that certain conditions (e.g., a ball being volleyed by a player before the ball can bounce, or a ball extending outside a camera's field of view) are not addressed in this simplified high-level flowchart 100c.

This process continues until the initial ball bounce is detected in step 155c, at which point these systems then make the line-call decision (IN or OUT) in step 160c by comparing the relative location of the tennis ball upon its initial bounce to the known location of relevant court lines (previously determined in a step not shown in FIG. 1C before the system is put into service). This process is also relatively straightforward given precise 3D locations (i.e., 2D locations in an X-Y coordinate system on the surface of the tennis court) of both the tennis ball and all court lines.

Note that this process 100c raises a question as to the necessity of the calculation of a precise 3D ball location in step 150c, given that detection of the initial ball bounce in step 155c is the key object state condition that triggers the need for the key decision (line call) in step 160c. As will be illustrated below, there is a need for a system that addresses the deficiencies resulting from unnecessary applications of multi-camera and moving-camera "solutions" to decisions required in 3D object-tracking scenarios.

SUMMARY

While the scope of the present invention extends to virtually any 3D object-tracking scenario requiring decisions relating to the actual or relative locations of moving and static objects, the key concepts of the present invention, and the way in which these concepts overcome the deficiencies of existing approaches noted above, can best be understood in the context of specific decision-making scenarios. In the field of computer vision, as suggested above, many of these deficiencies result from the unnecessary use of multi-camera and moving-camera approaches to decision-making scenarios in which such "solutions" are cost-prohibitive or otherwise impractical.

The present invention overcomes these deficiencies by leveraging a single fixed-location camera to identify object state conditions that effectively transform a 3D object-tracking problem that otherwise would require a multi-camera or moving-camera solution into a 2D planar problem that can be solved by relying upon video frames generated by a single fixed-location camera. The following embodiments, though described in the context of an automated tennis line-calling scenario, are equally applicable to other 3D object-tracking scenarios in which such object state conditions can be identified without employing moving or multiple cameras.

The present invention, in one embodiment, is implemented as a line-calling device that contains a single fixed-location camera located in proximity to the net post of a tennis court. In some embodiments, the device is physically attached to one of the net posts, while in others it is located on a tripod or other stand nearby one of the net posts (or even on an umpire chair if available). In any event, locating the device in proximity to the net post provides a relatively close-up view of each side of the tennis court (regardless of the number of cameras employed).

The device includes, in one embodiment, a single fixed-location camera with a field of view that covers both sides of the tennis court. In another embodiment, the device includes two such cameras, with each camera having a field of view covering one of the two sides of the tennis court (effectively providing greater resolution per camera by covering a smaller area).

Various cost and engineering tradeoffs will determine not only the number of cameras, but their characteristics, such as speed, resolution, field of view, etc. Based on these tradeoffs, additional cameras may be included in other embodiments covering even smaller sections of the tennis court. In still other embodiments, two devices are employed (one in proximity to each net post) for the purpose of minimizing the likelihood of an obstructed view of a moving tennis ball (e.g., due to a player being in the line of sight of a camera's view of the ball—more likely in doubles than in singles).

It is important to emphasize, however, that regardless of the type and number of cameras employed (or even the number of devices in proximity to each net post), the device of the present invention also includes an integrated processing mechanism to implement the device's line-calling functionality. In one embodiment, this integrated processing mechanism relies upon the video frame generated by a single fixed-location camera at any given moment in time (even though prior video frames from other cameras may be considered to determine which camera's video frame to select as a ball travels from one side of the tennis court to the other).

In other words, 3D triangulation (though made possible by employing multiple cameras viewing a given location at a given moment in time) is unnecessary to achieve the benefits of the present invention. When warranted, additional cameras are employed to obtain other benefits (e.g., minimizing player obstruction, leveraging lower-resolution cameras, etc.). In certain cases, optional 3D triangulation may also be employed, though it is unnecessary to achieve the benefits of the present invention.

One key advantage of the device of the present invention is an extremely simple setup process. One can attach the device to virtually any tennis net post in a matter of seconds, and remove it even more easily, making it extremely portable. Another key advantage is its integrated processing mechanism that implements line-calling and other functionality without requiring external devices. An internal battery provides sufficient power for the typical length of an entire match, thus eliminating the need to rely on the presence of external courtside power.

In addition, an auto-calibration feature enables the device, in one embodiment, to identify the court lines within a few seconds, greatly simplifying the initial setup process and making the device truly portable among different tennis courts. As a result of this auto-calibration process, a "court map" is generated, reflecting known static locations of the court lines, the net and the camera (based on known tennis court dimensions), as well as a "court model" reflecting a function translating 2D coordinates from a video frame to 3D coordinates on the court map (based on the assumption that the ball has bounced and is thus in contact with the 2D surface of the tennis court).

Because the device is fully automated, once it performs its auto-calibration process, it tracks the state of the tennis match without the need for a manual operator. In particular (as will be explained in greater detail below), it identifies the beginning of each point and automatically generates and indicates line calls (e.g., via a flashing colored light and/or sound—whether after each bounce, only on "OUT" calls, close calls or other desired permutations). In addition to "match mode," the device has a practice or "free play" mode in one embodiment to enable selective line calls and statistics (e.g., limiting line calls to the baseline or a particular service line or sideline). In another embodiment, the device transmits the results of line calls wirelessly to a wearable device (e.g., a Bluetooth vibrator located on a player's racquet, shirt, pocket, etc.). In yet another embodiment, the device displays and/or calls out the score before each point (or at designated intervals, such as the beginning of each game).

The device includes an integrated accelerometer in another embodiment to detect "let cords" and a microphone to facilitate ball and player detection (e.g., to assist in the detection of which side of the court the ball is on, as well as to analyze sound-wave harmonics with a Fourier transformation in order to distinguish shot types). In another embodiment, data from racquet sensors are utilized to enhance the accuracy of player and ball detection.

The device includes an interactive integrated video display screen in one embodiment for displaying match statistics and other data, as well as recorded video (all of which can be stored locally, e.g., on a removable memory card, and downloaded via a wired USB or other connection, as well as streamed/uploaded wirelessly over Bluetooth or a local WiFi network or the Internet, to a smartphone, tablet, laptop or other device). Players can view instant replays (optionally skipping changeovers and other "dead time") and ball bounce location as well as various match statistics and visualizations upon demand, whether via the integrated video display screen or a connected device (from courtside or remotely over the Internet). Such statistics are similar to those provided by professional television tennis analysts—such as ball location percentages within multiple zones, ball speed and RPM, player coverage maps, etc.

In another embodiment, additional software (e.g., an iOS, Android or other smartphone app, or MacOS, Windows or other desktop application) provides for added long-term storage and analytic and visualization functionality to the extent not integrated directly in the device. For example, such functionality includes analysis of the speed, spin and placement of each player's shots, and an augmented reality (including 3D visualization) overlay on recorded video of the match. An open API is included in another embodiment to provide extensibility for third parties to provide additional analytic, visualization and other functionality (e.g., recommended player strategies against particular opponents or types of players, based on prior performances and AI/predictive analyses). Such additional functionality can also be provided as in-app purchases in another embodiment.

It should be emphasized that the device of the present invention provides integrated real-time line-calling functionality that is not dependent on the cloud or any network connection, or any external processing device. It generates highly accurate line calls—e.g., within a few centimeters of any line. Because the accuracy of the device is essentially proportional to the frame rate and resolution of the integrated camera system, the device's accuracy will only improve over time as camera technology improves and costs decrease.

As will be discussed in greater detail below, because the device in one embodiment is incapable of tracking ball location in 3D space via a single fixed-location camera (whether covering the entire court or limited to one side of the court), the device instead makes line calls by detecting "ball bounce" as the key object state condition that triggers a line call. Upon detecting the initial bounce of the ball, the line-call decision has now been transformed to a 2D planar problem—i.e., determining whether the ball (known to be in the 2D plane of the tennis court surface) is "OUT" relative to any relevant line (e.g., whether a service line, baseline or sideline).

Various alternative methods of making line-call decisions are discussed below, including translating ball coordinate locations from video frames to the court map (with or without the benefit of a controlled laser device), or alternatively analyzing the relative locations of the ball and relevant court lines solely on the video frames themselves. As will be emphasized below, these determinations do not necessarily even require that the precise location of the ball within the 2D court plane be determined.

Finally, it should be noted that the hardware and software embodiments described below are the result of cost and engineering tradeoffs that can be modified without departing from the spirit of the present invention. Whether functionality is implemented purely in hardware or software, or in a combination of the two (including "firmware" and custom as opposed to general-purpose hardware) is a function of these tradeoffs, and not necessarily essential to the spirit of the present invention. Moreover, division of functionality into particular hardware components or software modules is also the result of such tradeoffs. Functionality can therefore be allocated (combined or divided) into different physical hardware components or conceptual software modules from those illustrated in the embodiments below without departing from the spirit of the present invention. Similarly, the present invention can be implemented with variations in device placement and attachment mechanisms, as well as the type and number of cameras and other sensors. Finally, the present invention can be implemented for different sports or other activities without departing from the spirit of the present invention, essentially covering virtually any 3D object-tracking scenario requiring decisions relating to the actual or relative locations of moving and static objects.

BRIEF DESCRIPTION OF DRAWINGS

FIG. 11B is a flowchart illustrating key steps performed by an alternative Line Calling component of one embodiment of an integrated device of the present invention, following detection of a ball bounce by the Bounce Detection component of the integrated device.

DETAILED DESCRIPTION

Figure 1A:
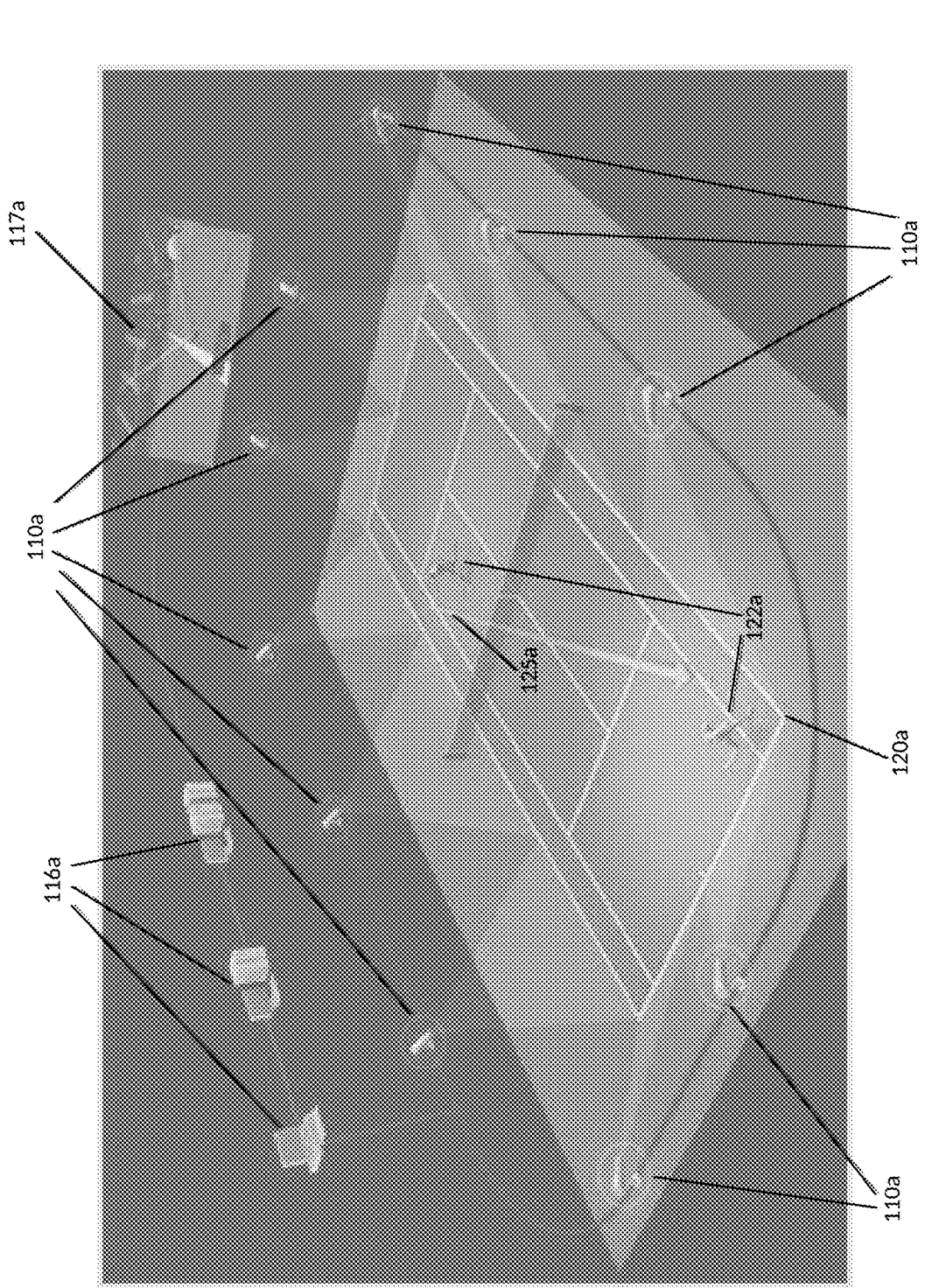
FIG. 1A is an image illustrating an existing system (known as HAWK-EYE™) that employs multiple cameras and external processing to visually track the location and trajectory of a ball for the purpose of performing line-calling and other functions in tennis and a variety of other sports.
Figure 1B:
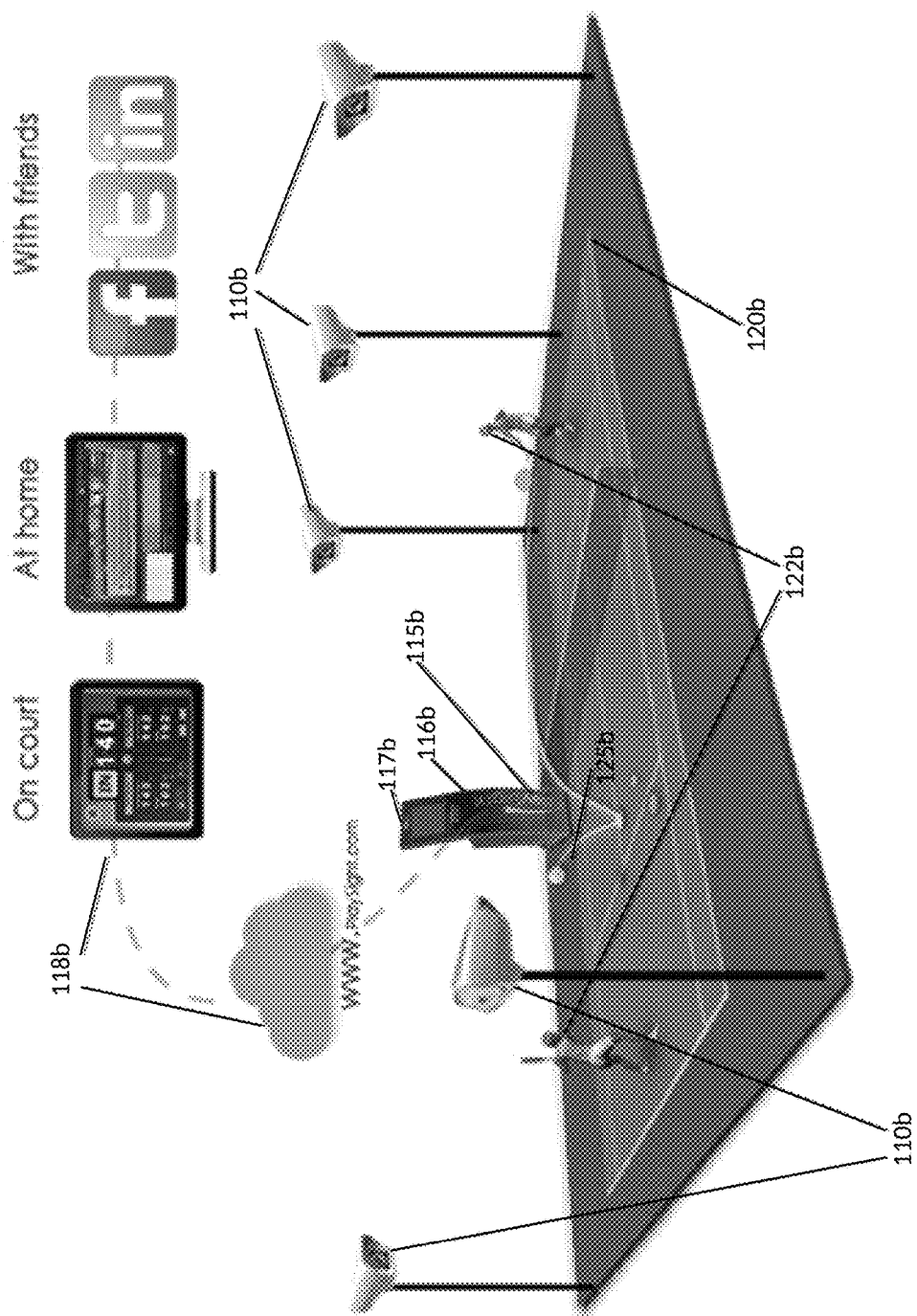
FIG. 1B is an image illustrating an existing system (known as the PLAYSIGHT® SmartCourt™ system) that employs multiple cameras and external processing to visually track the location and trajectory of a ball for the purpose of performing line-calling and other functions in tennis and a variety of other sports.
Figure 1C:
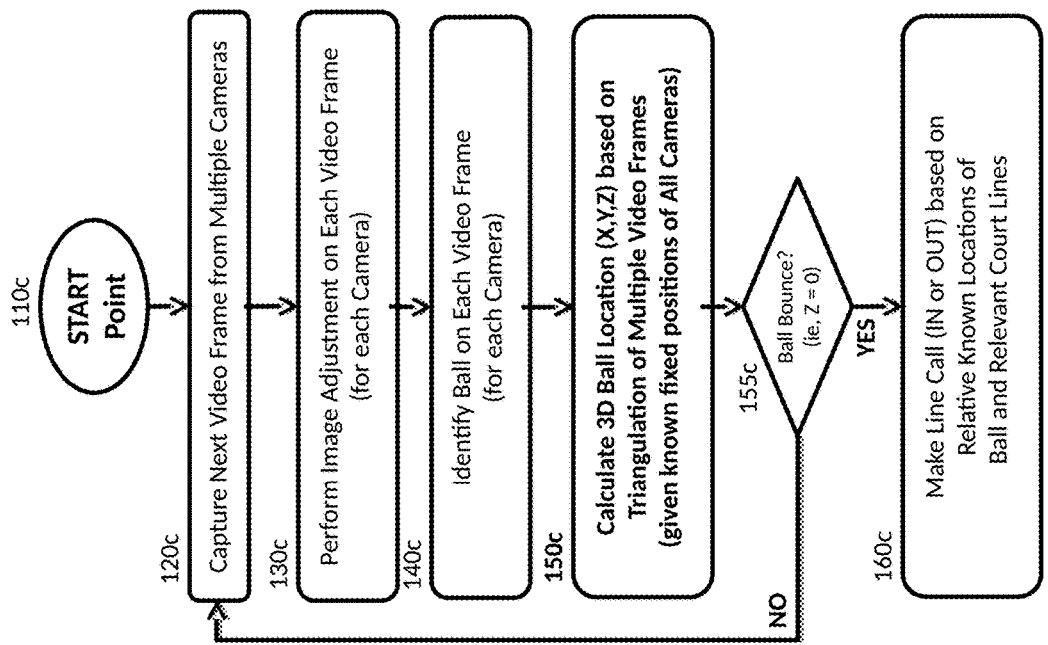
FIG. 1C is a high-level flowchart illustrating key steps performed by existing multi-camera systems (such as HAWK-EYE™ and PLAYSIGHT® SmartCourt™) in a tennis line-calling scenario.
Figure 2:
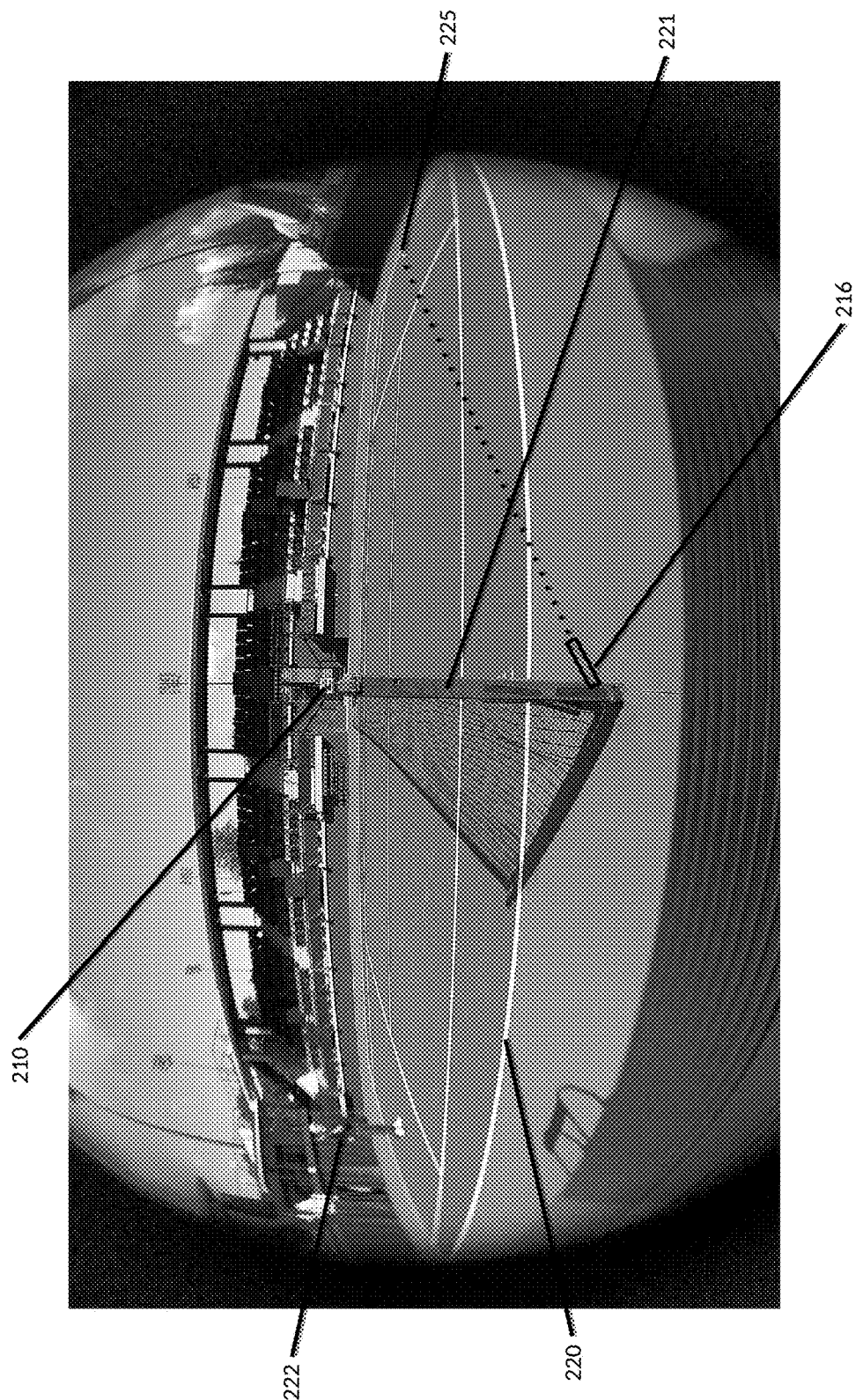
FIG. 2 is an image illustrating one embodiment of an integrated device of the present invention in a tennis line-calling scenario in which the integrated device is in proximity to a tennis net post.

In one embodiment of the present invention, illustrated in image 200 of FIG. 2, an automated tennis line-calling device 210 is located in proximity to a tennis net post 221 on a tennis court 220 (including standard court lines and a net attached between two net posts). Image 200 includes the entire tennis court 220 and surrounding area, as well as players 222 (only one shown) and the tennis ball 225. Also shown in image 200 is a laser 216 (discussed in greater detail below) employed in an alternative embodiment of the present invention to facilitate precise location of a ball upon its initial bounce on the surface of a tennis court.

Line-calling device 210 is illustrated as physically attached to net post 221 to provide a relatively close "camera view" of both sides of the entire tennis court 220, and to facilitate an extremely convenient setup process since all tennis courts have net posts. In other embodiments, line-calling device 210 is located in proximity to net post 221, but not necessarily physically attached (e.g., on a tripod or other stand nearby net post 221). One key advantage of locating line-calling device 210 in proximity to net post 221 (regardless of the number of cameras employed) is that it enables line-calling device 210 to obtain a relatively close view of both sides of the entire tennis court 220.

Figure 3A:
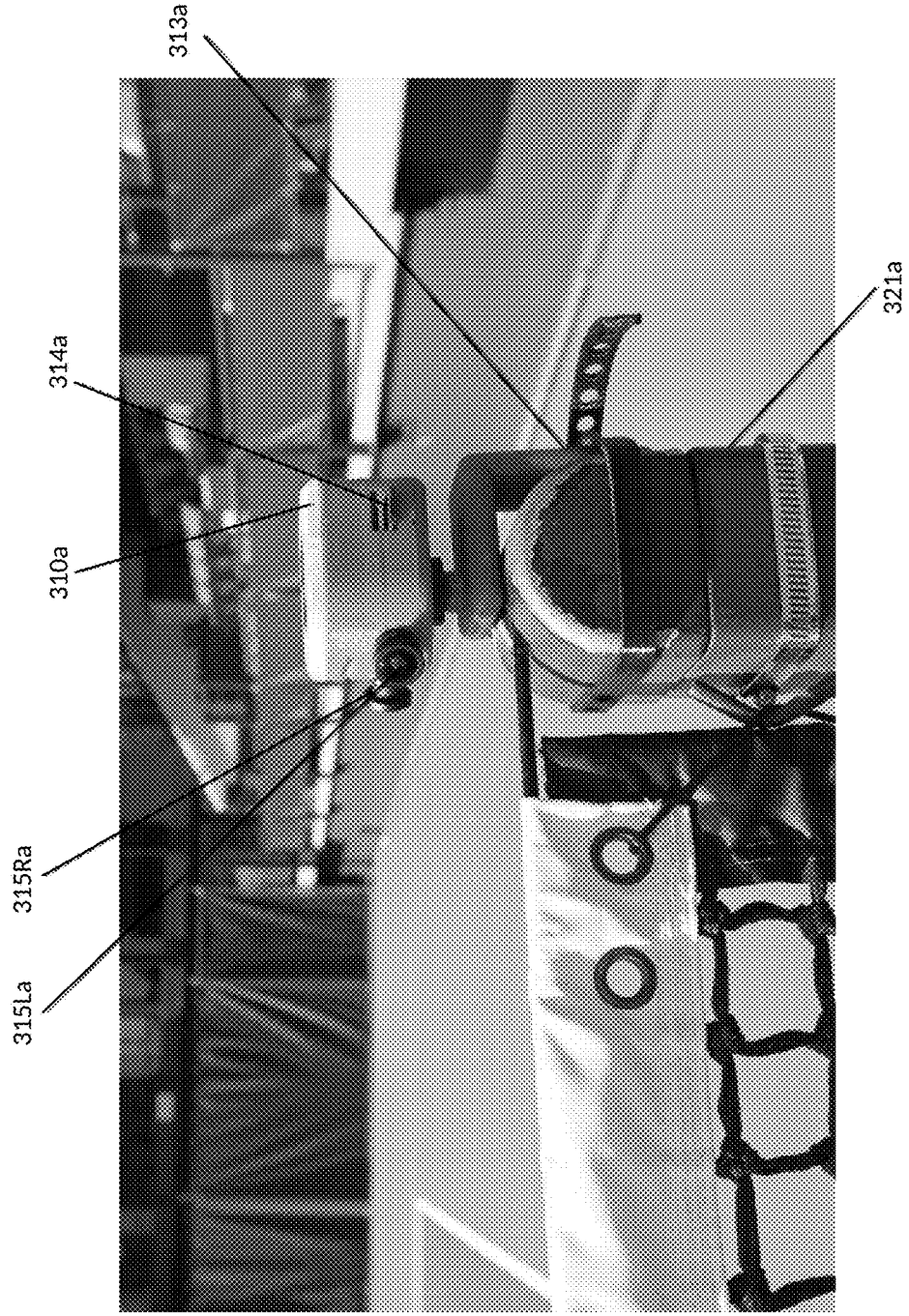
FIG. 3A is an image illustrating a close-up view of one embodiment of an integrated device of the present invention attached to a tennis net post, with a distinct camera pointing toward each side of the tennis court.

Image 300a in FIG. 3A illustrates a close-up view of one embodiment of tennis line-calling device 310a containing a single fixed-location camera (camera 315La for the left side and camera 315Ra for the right side) for each of the two sides of the tennis court. In other embodiments, a single fixed-location camera covers the entire tennis court (both left and right sides), though at the expense of potentially greater image resolution, particularly at the far baselines of tennis court 320. In still other embodiments, multiple cameras (e.g., one on top of the other) and/or multiple devices (e.g., one on each net post, with each device containing one or more cameras) are employed.

In these "multiple video cameras per side of the court" embodiments (including multiple line-calling devices), optional 3D triangulation may be employed. Moreover, even without 3D triangulation, certain other advantages are evident. For example, a second line-calling device would minimize player obstruction (e.g., a player's foot blocking a single video camera's view of the tennis ball). This could be particularly useful for a doubles tennis match. Moreover, greater accuracy could be obtained by using the "closer" video camera (e.g., minimizing errors due to the distance from a line-calling device to the far corner of the baseline). Finally, computation could be shared among two line-calling devices, increasing performance.

Line-calling device 310a also includes, in one embodiment, a memory card reader 314a that enables removable local storage of recorded video as well as related statistical data. As will be discussed in greater detail below, line-calling device 310a can also (in another embodiment) transmit recorded video and data to connected devices (e.g., smartphones, tablets, laptops, etc.) via a built-in wireless communication component, or enable such devices to download recorded video and data directly via a wired connection (e.g., via a built-in USB port in line-calling device 310a).

Physical attachment mechanism 313a enables line-calling device 310a to be attached to virtually any net post 321a in a matter of seconds. Such "compatibility" is significant in that no other central location is guaranteed to be available at virtually any tennis court from which a line-calling device can provide a relatively close view of both sides of a tennis court (regardless of the number of cameras employed).

Figure 3B:
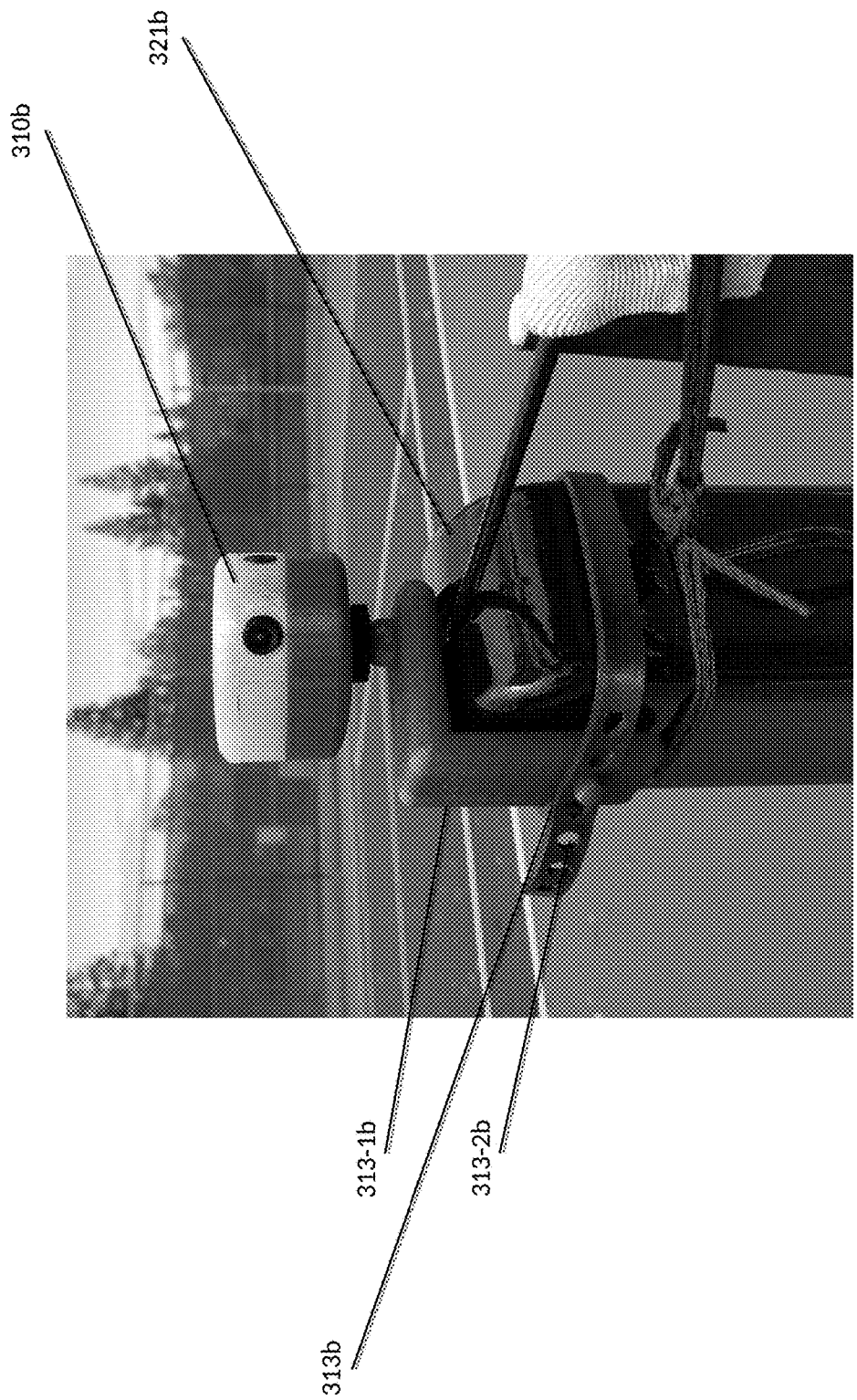
FIG. 3B is an image illustrating a close-up view of one embodiment of an attachment mechanism by which one embodiment of an integrated device of the present invention is attached to a tennis net post.

Image 300b in FIG. 3B illustrates a close-up view of one embodiment of this "universal" attachment mechanism 313b that enables line-calling device 310b to be attached to virtually any net post 321b in under a minute. In this embodiment, attachment mechanism 313b includes an "L-shaped stand" 313-1b that provides a flat level surface to which line-calling device 310b is attached, and an elastic strap 313-2b that attaches stand 313-1b to net post 321b. Compare, for example, the much more extensive setup task of installing multiple video cameras at various locations around a tennis court, not to mention providing a mechanism for those video cameras to communicate to an external processing system incorporating line-calling functionality.

Figure 3C:
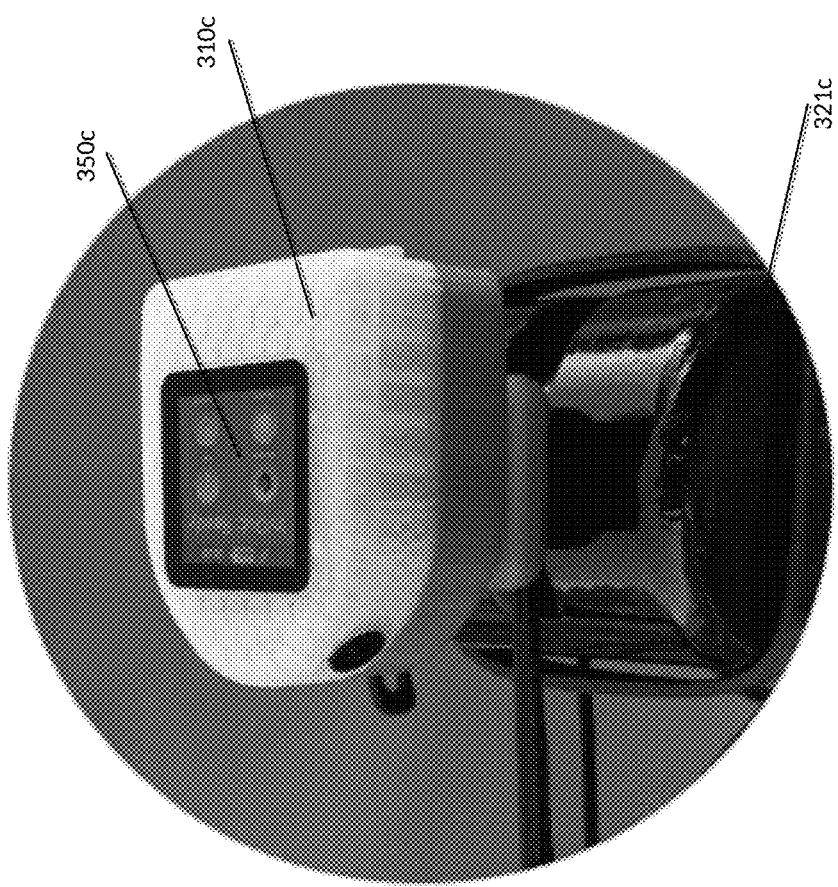
FIG. 3C is an image illustrating a close-up top view of one embodiment of an integrated device of the present invention attached to a tennis net post and incorporating a built-in interactive video display screen.

Image 300c in FIG. 3C illustrates a close-up top view of one embodiment of line-calling device 310c (attached to net post 321c), revealing a built-in interactive video display screen 350c that enables players (e.g., during changeovers) to view instant replays of recent points, including a zoomed-in view of the ball (and nearby court lines) upon its initial bounce on the surface of the tennis court. In other embodiments, interactive video display screen 350c also provides players with interactive graphic illustrations, visualizations, statistical data and strategic analyses, both during and after matches or practice sessions.

Figure 4A:
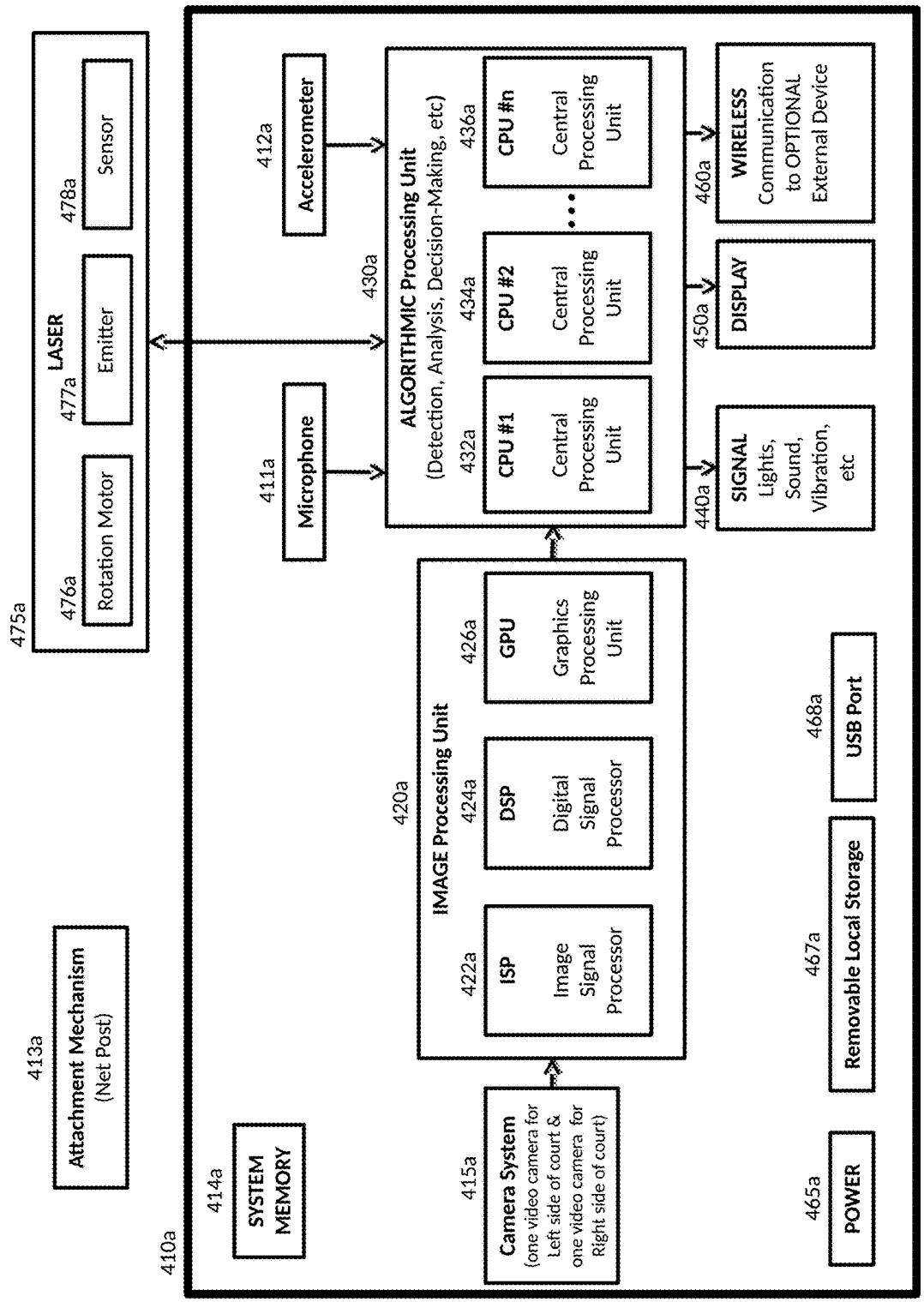
FIG. 4A is a hardware block diagram illustrating key hardware elements of one embodiment of an integrated device of the present invention.

Block diagram 400a in FIG. 4A illustrates key hardware elements of one embodiment of line-calling device 410a, as well as net-post attachment mechanism 413a and an external laser 475a that is employed in alternative embodiments to facilitate precise location of a ball upon its initial bounce on the surface of a tennis court. As will be discussed in greater detail below, external laser 475a enables line-calling device 410a to track the trajectory of a ball (via rotation motor 476a) and more precisely detect its location when it bounces on the surface of a tennis court (via Emitter 477a and Sensor 478a, which enable line-calling device 410a to calculate a precise distance to the ball).

As noted above, line-calling device 410a includes a camera system 415a which, in this embodiment, includes two cameras (each camera generating video frames for one side of the tennis court). In other words, a single video camera generates video frames covering the left side of the court, while another video camera generates video frames covering the right side of the court. In this manner, as will be discussed in greater detail below (e.g., with respect to auto-calibration, bounce detection and line-calling processes), device 410*a* can record a relatively close-up view of the ball as it travels from one side of the court across the net to the other side of the court (with device 410*a* initially selecting one of the two cameras for video frame processing, and switching to the other camera as the ball reaches a threshold proximity to the net—i.e., the edge of the video frame). As noted above, in other embodiments, camera system 415*a* can be limited to a single fixed-location camera covering the entire court with a very wide angle (though at the expense of resolution, particularly toward the ends of the court).

Having generated and selected a video frame for processing at any given moment in time (as well as retrieving prior video frames), Image Processing Unit 420*a* performs image adjustments on that video frame to account for lens curvature, lighting conditions, video noise and other related factors. In essence, individual pixels of a video frame are modified (or, for example, compared to different threshold values to aid in object recognition) based on which particular algorithms are employed.

Because different types of processors (e.g., ISP 422*a*, DSP 424*a* and GPU 426*a*) provide different types of hardware functionality, a particular processor is selected for a particular part of the image-adjustment process based upon its suitability to the particular algorithm being employed. For example, if ISP 422*a* provides dedicated hardware support for a frequently-repeated step in a noise-reduction algorithm, that processor might be faster (and thus more suitable) for that aspect of the image-adjustment process.

As low-cost smartphone chipsets become more available and cost-effective, the use of these various different types of processors adds relatively little overall design and implementation cost. Moreover, given the large number of pixels that must be processed in real time (i.e., between the generation of each video frame), multiple co-processors are employed in parallel (in one embodiment) to perform certain sub-tasks of the image-adjustment process. In any event, those skilled in the art may make different tradeoffs regarding processor selection for different aspects of the image-adjustment process, including reliance upon parallel processing, without departing from the spirit of the present invention.

Once the video frame is adjusted by Image Processing Unit 420*a*, line-calling device 410*a* employs Algorithmic Processing Unit 430*a* to perform various object detection, analysis and decision-making processes (described in greater detail below), depending upon its state. During initial setup and live-play phases, line-calling device 410*a* relies upon Algorithmic Processing Unit 430*a* to perform various tasks.

For example, after being attached to a tennis net post, line-calling device 410*a* performs an auto-calibration process, described in greater detail below with reference to FIG. 7. Once activated (e.g., at the beginning of a tennis match), line-calling device 410*a* continuously determines the state of the match—in particular the state of each point as described in greater detail below with reference to FIG. 9 (including detection of player locations at the start of each point per FIG. 8). As the server puts the ball into player, line-calling device 410*a* monitors each bounce (or player volley, etc.) per FIG. 10, working together with FIG. 9, until the point ends and a line-call decision is made by line-calling device 410*a* via FIG. 11A, FIG. 11B and/or FIG. 11C.

In one embodiment, Algorithmic Processing Unit 430*a* relies upon multiple general-purpose CPUs (CPU #1 432*a*, CPU #2 434*a*, . . . CPU#n 436*a*) to implement these tasks.

In other embodiments, processors from Image Processing Unit 420*a* are also utilized to assist with certain sub-tasks, such as identifying moving areas from prior video frames. As with the image-adjustment process, the multiple processors of Algorithmic Processing Unit 430*a*, in one embodiment, perform certain of these tasks or sub-tasks in parallel. Here too, those skilled in the art may make different tradeoffs regarding allocation of tasks among the multiple processors (including ISP 422*a*, DSP 424*a* and GPU 426*a*), including reliance upon parallel processing, without departing from the spirit of the present invention.

Line-calling device 410*a* relies upon system memory 414*a*, as well as memory allocated explicitly to Image Processing Unit 420*a* and/or Algorithmic Processing Unit 430*a* (or the processors contained therein), to store data to facilitate all of its tasks, including storage of software and firmware that controls the operation of these tasks (described in greater detail below with reference to FIG. 5). Those skilled in the art may allocate functionality differently between dedicated hardware and such software and firmware without departing from the spirit of the present invention.

In one embodiment, Algorithmic Processing Unit 430*a* takes as input (in addition to the video frames generated by Camera System 415*a*) external acceleration data from Accelerometer 412*a* to assist in the calling of a "let cord" during a serve or rally. In other embodiments, input from Microphone 411*a* is used for a variety of purposes, including detection of the sound of the ball to aid in determining which side of the court the ball is on, as well as shot-type detection (e.g., topspin, slice, etc.) and player location detection (e.g., to determine the location of the player about to serve). In one such embodiment, these determinations are based on the harmonics of detected sound waves extracted via calculation of Fourier transformations. In yet another embodiment, player and ball location accuracy is improved by integration with data from external racquet sensors (not shown).

Whenever Algorithmic Processing Unit 430*a* makes a line-call decision, line-calling device 410*a* employs Signal unit 440*a* to indicate the results of that line-call decision (i.e., IN or OUT) to the players. In one embodiment, a colored flashing light is employed (e.g., green for IN and red for OUT), while in another embodiment a sound is emitted instead of, or in addition to the flashing light. In other embodiments, Signal unit 440*a* generates a line-call indicator signal (light and/or sound) only when the ball is called OUT, or only when the ball bounces close to a relevant line.

As noted above, line-calling device 410*a* includes a built-in interactive video display screen 450*a* for displaying match statistics and other data, as well as recorded video. Players can view instant replays, zoomed-in ball bounce location and various match statistics and interactive graphics and visualizations upon demand (e.g., during changeovers or after a match or practice session). In one embodiment, recorded video and related statistical and strategic data can also be live-streamed to a network-connected device (e.g., a smartphone, tablet or laptop) via Wireless Communication unit 460*a*, or stored locally on Removable Local Storage unit 467*a* (e.g., a removable memory card) for subsequent downloading to such external devices. In other embodiments, recorded video and related statistical data are stored in System Memory 414*a* and downloaded to such external devices via a wired connection, such as USB port 468*a*.

In one embodiment, Power unit 465*a* includes a built-in removable battery that provides line-calling device 410*a* with sufficient power to monitor and record an entire (average-length) tennis match—e.g., two+ hours. In another embodiment, line-calling device 410a also accepts external power (e.g., via an AC plug) for off-court use or in the event of an available courtside power source. In other embodiments, line-calling device 410a also accepts external battery packs (or an attached solar array) for extended usage.

Figure 4B:
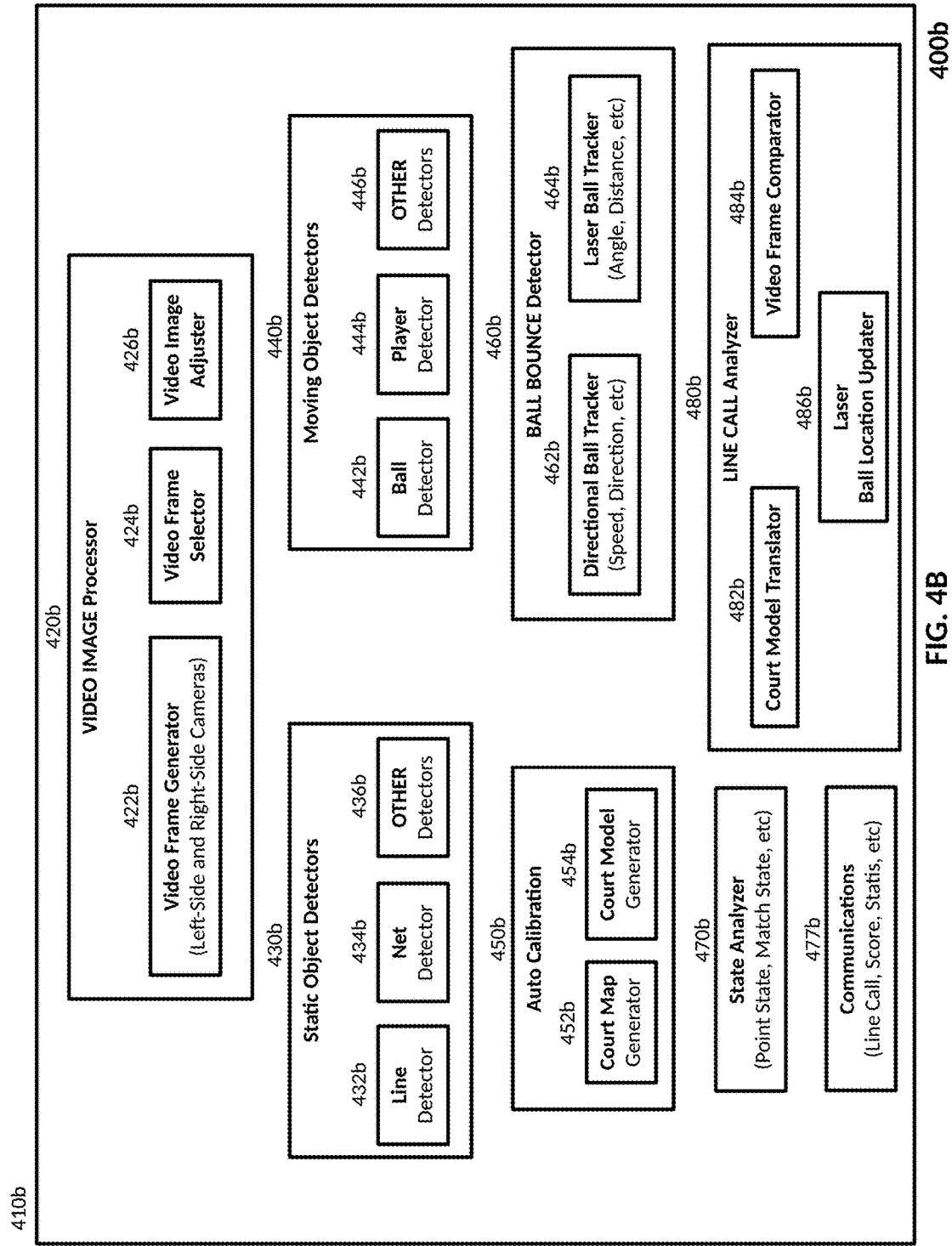
FIG. 4B is a software block diagram illustrating key software elements of one embodiment of an integrated device of the present invention.

Block diagram 400b in FIG. 4B illustrates key conceptual software modules of one embodiment of line-calling device 410a. In conjunction with Image Processing unit 420a, Video Image Processor module 420b controls the image adjustment process. Video Frame Generator module 422b extracts the video frames generated by Camera System 415a so that Video Frame Selector module 424b can select a video frame (from the video frames generated by the left-side and right-side video cameras) for image adjustment.

In one embodiment, Video Frame Selector module 424b initially selects the camera on the server's side, and continually analyzes subsequent video frames to determine when the ball is approaching the net, at which point it selects video frames from the other camera. Video Image Adjuster module 426b then implements the various image-adjustment algorithms referenced above (and described in greater detail below with reference to FIGS. 7 and 10) to modify each video frame to address lens curvature, lighting conditions, video noise and other related factors.

Static Object Detectors module 430b includes modules for detecting static objects, such as tennis court lines (Line Detector module 432b), tennis court net (Net Detection module 434b) and, in other embodiments, other static objects (Other Detectors module 436b)—e.g., in other applications such as the goals of a soccer field. The details of one embodiment of such a static object detection process performed by line-calling device 410a are described below in connection with the auto-calibration process illustrated in FIG. 7.

Figure 8:
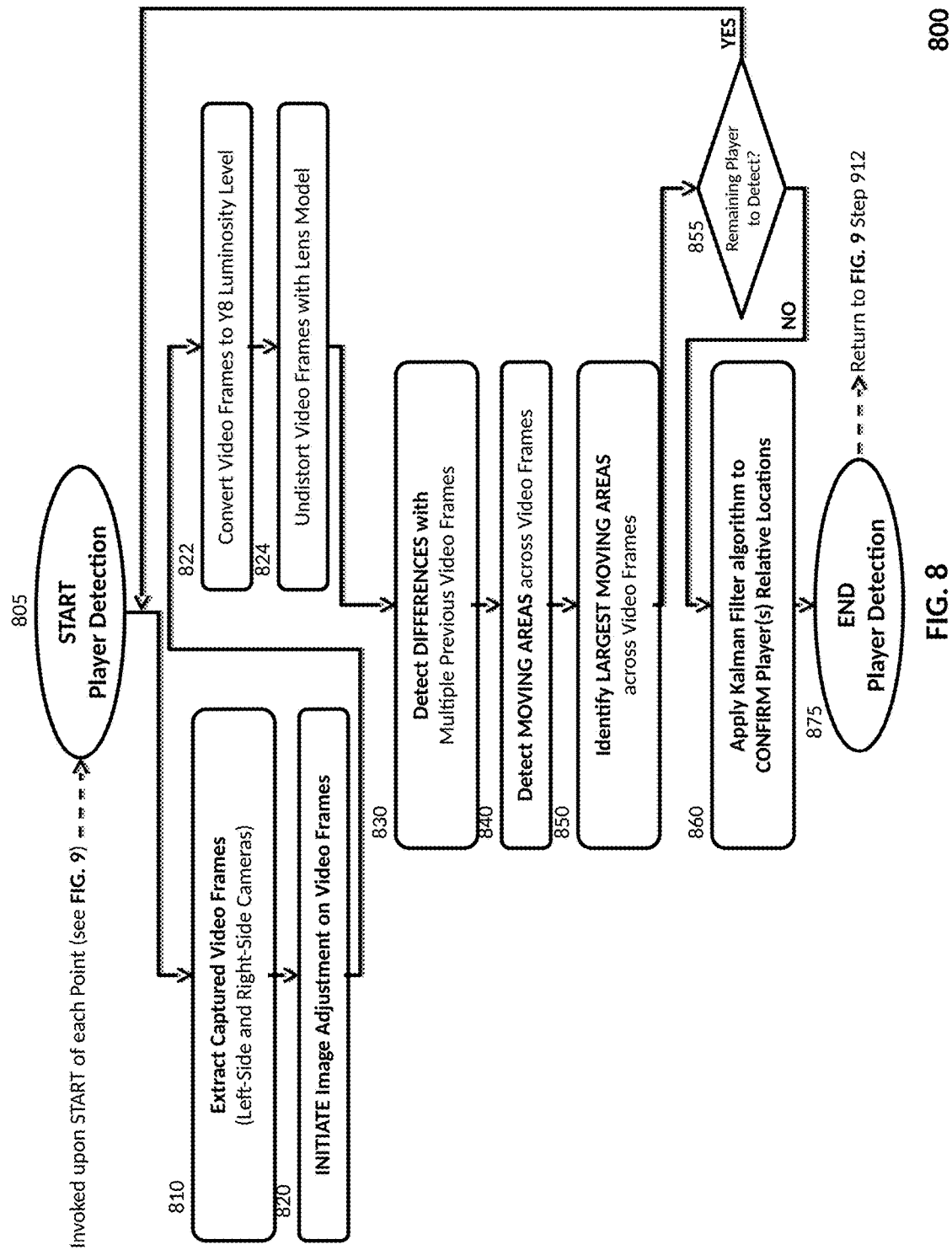
FIG. 8 is a flowchart illustrating key steps performed by a Player Detection component of one embodiment of an integrated device of the present invention to identify relative locations of tennis players and facilitate "Point State" detection in a tennis line-calling scenario.

During the playing of each point of a tennis match, line-calling device 410a relies on Moving Object Detectors module 440b to identify specific moving objects, such as the tennis ball (via Ball Detector module 442b) as it moves from one side of the tennis court to the other. In one embodiment, at the start of each point of a tennis match (as determined by the process illustrated in FIG. 9), line-calling device 410a relies on Player Detector module 444b to identify the relative locations of the players (as illustrated in FIG. 8) for the purpose of determining which side of the court the server is on (e.g., left or right side relative to line-calling device 410a), as well as to which service box the server will be serving (e.g., deuce or ad service box).

Those skilled in the art may select from a variety of well-known object detection algorithms to identify a tennis ball and tennis player from successive video frames without departing from the spirit of the present invention. In other embodiments, line-calling device 410a relies on Other Detectors module 446b to detect moving objects in other applications—e.g., a puck in ice hockey, multiple billiard balls, etc.

As noted above, after line-calling device is attached to a tennis net post, it performs an auto-calibration process, which is described in greater detail below with reference to FIG. 7. Auto-Calibration module 450b performs two key aspects of this auto-calibration process—i.e., the generation of a court map and a court model.

Court Map Generator module 452b generates a static court map (see FIG. 6 below) based upon known tennis court dimensions and an analysis of the lines and corners of the tennis court detected by Static Object Detectors module 430b from the video frames (see FIGS. 5A and 5B below) generated for each side of the tennis court. Court Model Generator module 454b then generates a court model that, in one embodiment, is a function that translates 2D coordinates on a video frame to 3D coordinates on the court map (based on the assumption that, once the tennis ball has bounced, it is in contact with the 2D surface of the tennis court). The court model thus facilitates the translation of individual pixels and object locations (assumed to lie on the surface of the tennis court) from a video frame to corresponding locations on the surface of the tennis court represented by the court map.

Once the auto-calibration process has been completed and a tennis match begins, State Analyzer 470 manages the state of the match, and in particular the beginning and end of each point (as described in greater detail below with reference to FIG. 9. As noted above, once each point begins, one of the key aspects of the automatic line-calling functionality performed by line-calling device 410b is the detection of each ball bounce (or player volley) as the ball moves across the net from one side of the court to the other. This process, performed by Ball Bounce Detector module 460b and summarized briefly below, is described in greater detail below with reference to FIGS. 9 and 10.

In one embodiment, Directional Ball Tracker module 462b tracks the velocity (i.e., the speed and direction) of the tennis ball as it moves across the net from one side of the court to the other. As noted above, the precise location of the ball in 3D space at each moment in time (i.e., on each video frame generated by the relevant camera) cannot be determined from the video frames generated by a single fixed-location camera.

However, by recognizing that a "ball bounce" will result in an abrupt change in the ball's vertical direction (as compared with its expected "gravity-driven" direction), Directional Ball Tracker module 462b can, in one embodiment, determine whether such an abrupt change has occurred. If so, it then determines whether such a change is consistent with a "ball-bounce" event, requiring a line call. If Directional Ball Tracker module 462b determines that no such abrupt change occurred, or that the abrupt change was not consistent with a ball-bounce event (e.g., a volley by a receiving player), then the ball bounce detection process continues until a ball-bounce event occurs or until the end of the point is otherwise determined (e.g., a ball that leaves the field of view of the video cameras for a predefined period of time).

In another embodiment, Laser Ball Tracker 464b is employed to assist in the ultimate line-call determination (e.g., as described in greater detail below with reference to FIGS. 10, 11A and 11C). In essence, Laser Ball Tracker 464b continually determines from successive video frames (i.e., while the ball is moving in accordance with an expected "gravity-driven" direction, but has not yet bounced) the change in the ball's angle relative to the fixed location of Laser 475a. Laser Ball Tracker 464b then adjusts the angle of Laser 475a accordingly (via Rotation Motor 476a—controlled by a PID algorithm) to continue to track the ball.

Once Directional Ball Tracker module 462b determines that the ball has bounced, this bounce is confirmed by the fact that the beam emitted by Emitter 477a returns to Laser 475a, thereby enabling calculation of a precise distance between the ball (upon its initial bounce on the surface of the tennis court) and Laser 475a—whether via direct "time of flight" or "phase-based" laser scanning. This distance is then utilized (as discussed below) to enable line-calling device 410b to make a more precise line call.

Upon a determination by Directional Ball Tracker module 462b that the ball has bounced, Line Call Analyzer module 480b makes the actual line call. In one embodiment, Court Model Translator module 482b utilizes the court model to translate the ball's location on the video frame (upon its initial bounce on the surface of the tennis court) to its corresponding location on the court map, from which a line-call determination can be made by Line Call Analyzer module 480b (as described in greater detail below with reference to FIG. 11A).

Note, however, that this translation may still be subject to a certain degree of error, which can be reduced significantly if Laser 475a is present. In such an embodiment, the precise distance generated by Laser Ball Tracker 464b is used by Laser Ball Location Updater 486b to update the location on the court map determined by Court Model Translator module 482b before Line Call Analyzer module 480b makes its line-call determination.

In an alternative embodiment, Line Call Analyzer module 480b does not rely upon Court Model Translator module 482b, which utilizes the court model. Instead, it relies upon Video Frame Comparator 484b to make the line call based solely upon the relative locations of the ball and relevant court lines on the video frame generated upon the ball's initial bounce on the surface of the tennis court. This embodiment is particularly useful when the ball bounces very close to a relevant line—assuming Laser 475a is not present and the accumulated error in a translation based upon the court model is non-negligible. This embodiment is discussed in greater detail below with reference to FIG. 11B. It should be noted, however, that this embodiment (as compared to the embodiments illustrated in FIGS. 11A and 11C) has the disadvantage of not determining a precise location of each ball-bounce event, which could otherwise be useful for subsequent statistical analyses and visualizations.

Finally, Communications module 477b manages a variety of different types of communications of line-calling device 410b with the outside world. In one embodiment, such communications include, for example, indications of the results of line calls via Signal unit 440a (e.g., flashing red and green lights, sounds, etc.), displays of instant video replays of points with zoomed-in ball locations, statistics, graphics and visualizations via Display unit 450a, wireless streaming of recorded video, as well as statistics, visualizations and other data to external devices (e.g., smartphones, tablets and laptops), both on local networks and via the Internet (via Wireless Communication unit 460a), and physical downloads of such recorded video and data via Removable Local Storage 467a and wired connections, such as USB Port 468a.

As referenced above, one embodiment of line-calling device 410a includes a Camera System 415a containing two high-speed, high-resolution video cameras—one for each side of the tennis court. During each moment in time (depending on video camera frame rates), each camera generates a video frame, one of which is selected and used (in conjunction with prior video frames from that camera) to detect objects (ball, players, etc.) and ultimately make line-call decisions. The video frame generated by each of these cameras is illustrated, respectively, in FIGS. 5A and 5B, and discussed below with respect to the coordinate system employed to identify the locations of individual pixels and objects on a video frame.

Figure 5A:
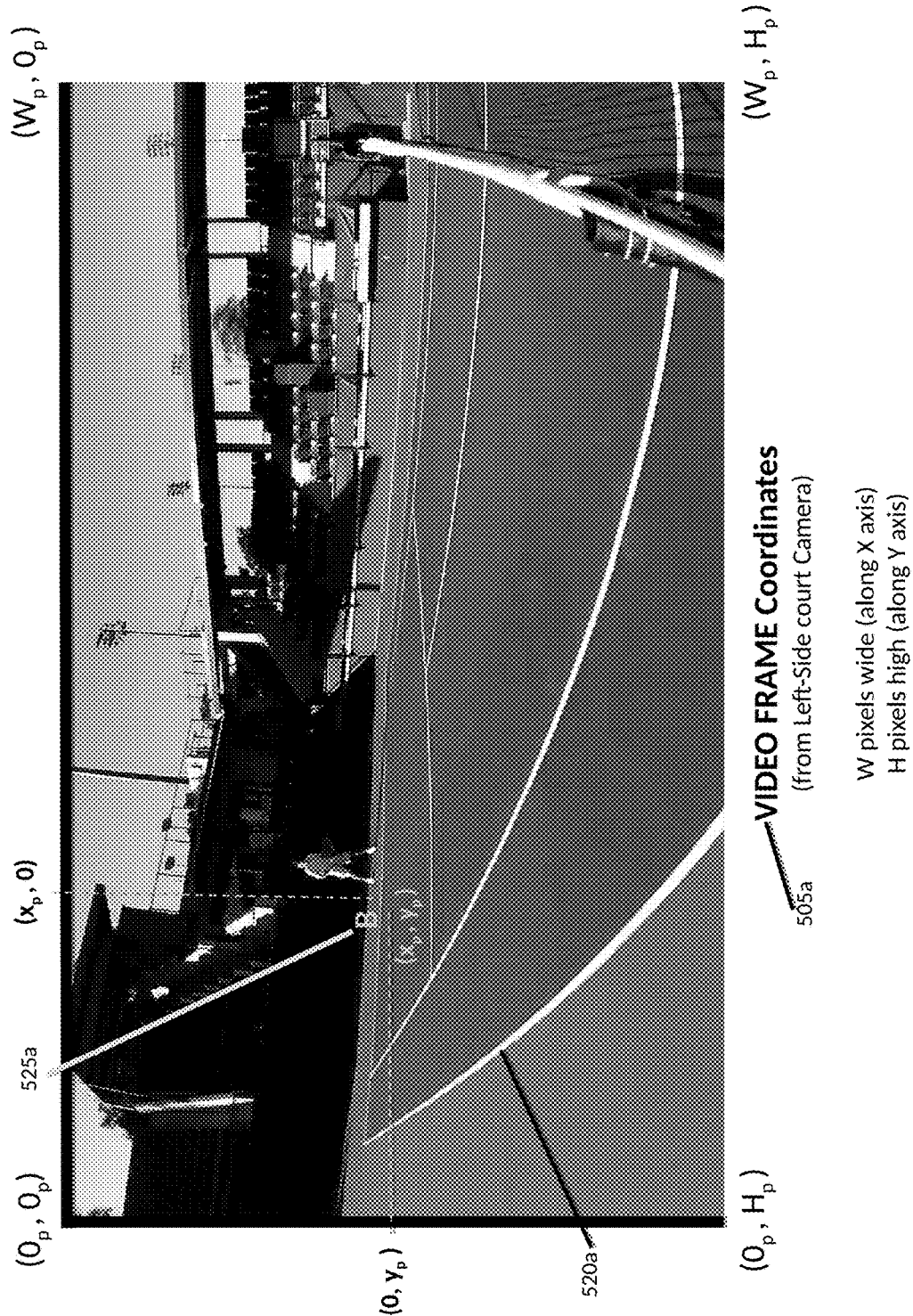
FIG. 5A is an image of a video frame, generated by a "left-side" camera component of one embodiment of an integrated device of the present invention, that reflects the field of view of that camera covering the left side of a tennis court, and includes a coordinate system employed by the integrated device to identify individual pixels and objects within that video frame.

Turning to FIG. 5A, image 500a illustrates a video frame generated by a left-side camera component of Camera System 415a that reflects the field of view of that camera covering the left side of tennis court 520a. The location of the lowest pixel of tennis ball 525a on video frame 500a is represented by a point "B" which has 2D pixel coordinates $(x_p, y_p)$ in the video frame coordinate system 505a having an X-axis width of "W" pixels and a Y-axis height of "H" pixels.

Figure 5B:
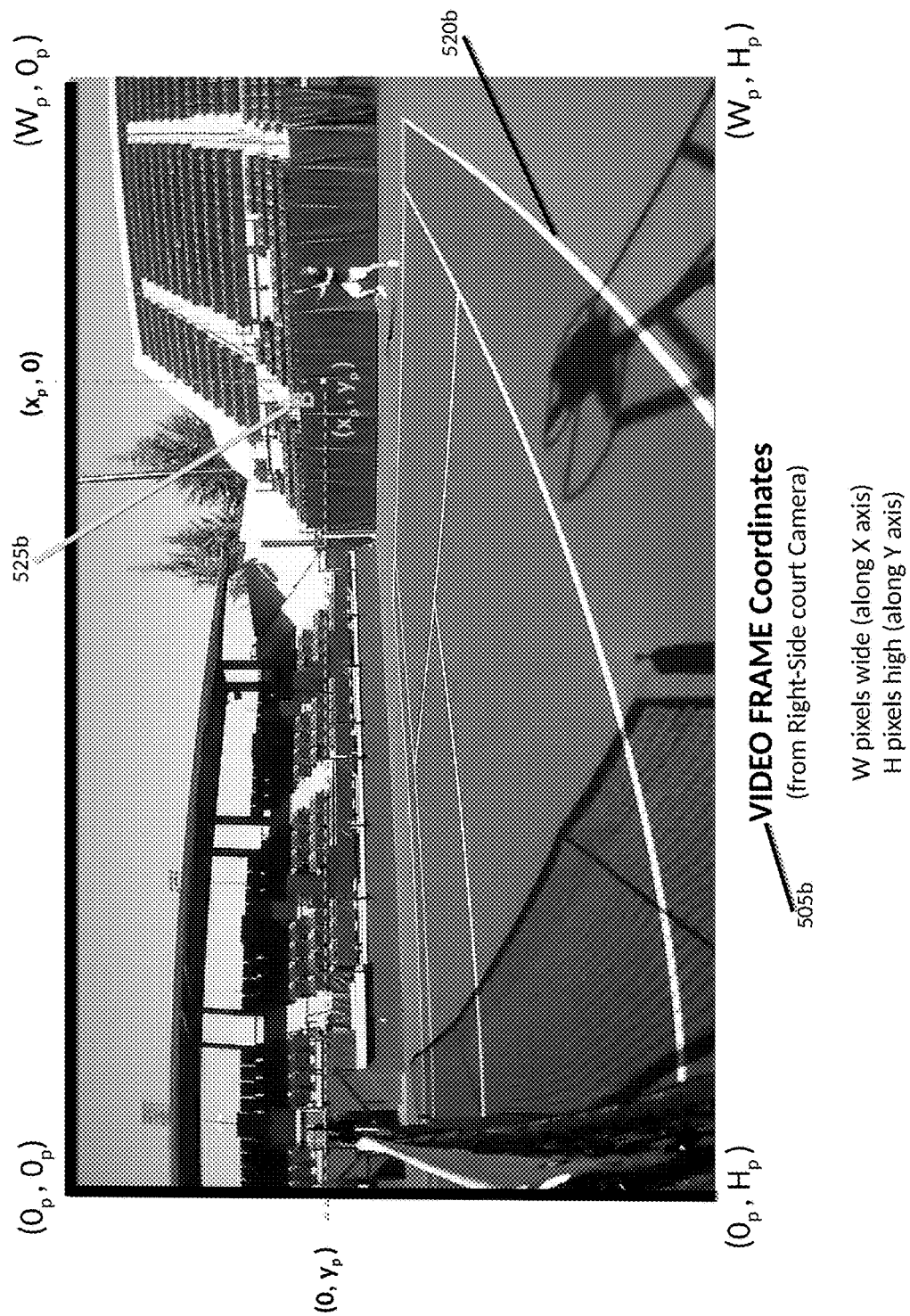
FIG. 5B is an image of a video frame, generated by a "right-side" camera component of one embodiment of an integrated device of the present invention, that reflects the field of view of that camera covering the right side of a tennis court, and includes a coordinate system employed by the integrated device to identify individual pixels and objects within that video frame.

Similarly, in FIG. 5B, image 500b illustrates a video frame generated by a right-side camera component of Camera System 415a that reflects the field of view of that camera covering the right side of tennis court 520b. The location of the lowest pixel of tennis ball 525b on video frame 500b is represented by a point "B" which has 2D pixel coordinates $(x_p, y_p)$ in the video frame coordinate system 505b having an X-axis width of "W" pixels and a Y-axis height of "H" pixels.

It should be emphasized that, as a general matter, the actual location of a tennis ball in 3D space cannot be determined solely from its 2D pixel location in a video frame, such as image 500a in FIG. 5A or image 500b in FIG. 5B. However, such a determination can be made given certain knowledge about the geometry of the scene.

For example, as will be described in greater detail below with reference to FIGS. 6 and 7, the dimensions of a tennis court are standardized, and thus well known. Moreover, the location of the video camera which generates a video frame (e.g., of one or both sides of a tennis court) is known. Therefore, the precise locations of the court lines on the surface of a tennis court can be reconstructed from a video frame that includes those court lines in the camera's field of view. Given this information, a "court map" can be constructed (illustrated in FIG. 6 below), as can a function or "court model" that facilitates the translation of individual pixels and object locations on a video frame to corresponding locations on the surface of the tennis court represented by the court map (as described with reference to FIG. 7 below).

Figure 6:
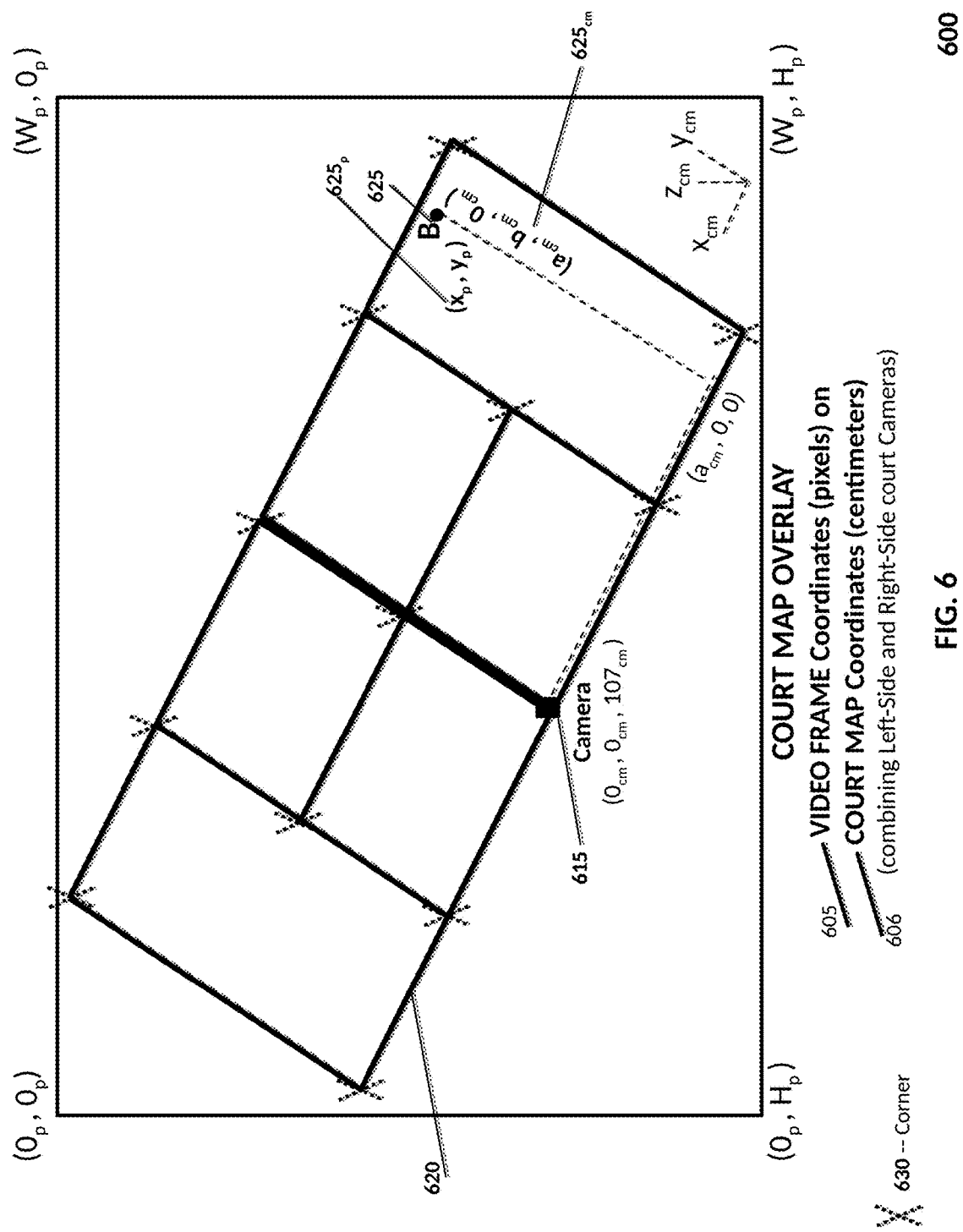
FIG. 6 is a graphic illustration of a court map of a tennis court, produced by one embodiment of an integrated device of the present invention by processing video frames generated by the "left-side" and "right-side" camera components of that integrated device, and employed by the integrated device to translate individual pixels and object locations on a video frame to corresponding locations on the playing surface of the tennis court represented by the court map.

Turning to FIG. 6, image 600 is a graphic illustration of one embodiment of a court map 620 of a tennis court, reconstructed from known court dimensions and 2D pixel coordinates of corners 630 (i.e., seven court-line intersections on each side) on video frames generated by left-side and right-side cameras of line-calling device 410a. Court map 620 is illustrated as a "court map overlay" in that points, represented in centimeters in the 3D court map coordinate system 606 $(x_{cm}, y_{cm}, z_{cm})$ are "overlaid" upon their corresponding locations (in pixels) in the 2D video frame coordinate system 605 $(x_p, y_p)$.

Note, however, that points in court map 620 are all located on the surface of the tennis court (i.e., $z=0_{cm}$), with the exception of the camera 615, the height of which is known (e.g., $107_{cm}$ in one embodiment). Camera 615 is illustrated as a single point at the origin of 3D court map coordinate system 606 for illustrative purposes, even though the precise locations of the left-side and right-side video cameras of line-calling device 410a differ slightly, and are considered in generating a single court map 620 from the respective video frames generated by these two cameras.

Though their coordinates are not illustrated in FIG. 6, each corner 630 can be represented as a single point (e.g., at the center of the intersection of two or more court lines, in one embodiment) that can be described in the 2D video frame coordinate system 605 in pixels as a point $(x_p, y_p)$ in its video frame (e.g., image 500a in FIG. 5A or image 500b in FIG. 5B), as well as in the 3D court map coordinate system 606 in centimeters $(x_{cm}, y_{cm}, 0_{cm})$ on the surface of the tennis court. These points can be described in both the 2D video frame coordinate system 605 $(x_p, y_p)$ and the 3D court map coordinate system 606 ($x_{cm}$, $y_{cm}$, $0_{cm}$) because they exist in the same plane—i.e., the surface of the tennis court.

As a result, line-calling device 410a can generate a function (referred to herein as a court model) that translates such points between these two coordinate systems (as described in greater detail below with reference to FIG. 7). This court model function is employed to translate individual pixels and object locations on a video frame to corresponding locations on the surface of the tennis court represented by court map 620 (and vice-versa).

Line-calling device 410a therefore also employs this court model function to translate the location of a tennis ball (upon its initial bounce on the surface of a tennis court) between these two coordinate systems. Once a tennis ball bounces on the surface of the tennis court, the point "B" 625, representing the lowest pixel of the tennis ball first touching the tennis court, can be described both in the 2D video frame coordinate system 605—as point ($x_p$, $y_p$) 625$_p$—and in the 3D court map coordinate system 606—as point ($a_{cm}$, $b_{cm}$, $0_{cm}$)—thereby enabling line-calling device 410a to determine the tennis ball's precise location on the surface of the tennis court (subject to a certain degree of translation error, discussed below). Given that location, line-calling device 410a can then determine whether the tennis ball is "IN" or "OUT" relative to any relevant line (e.g., baseline, service line, sideline, etc.), as discussed in greater detail below with reference to FIGS. 11A and 11C.

Figure 7:
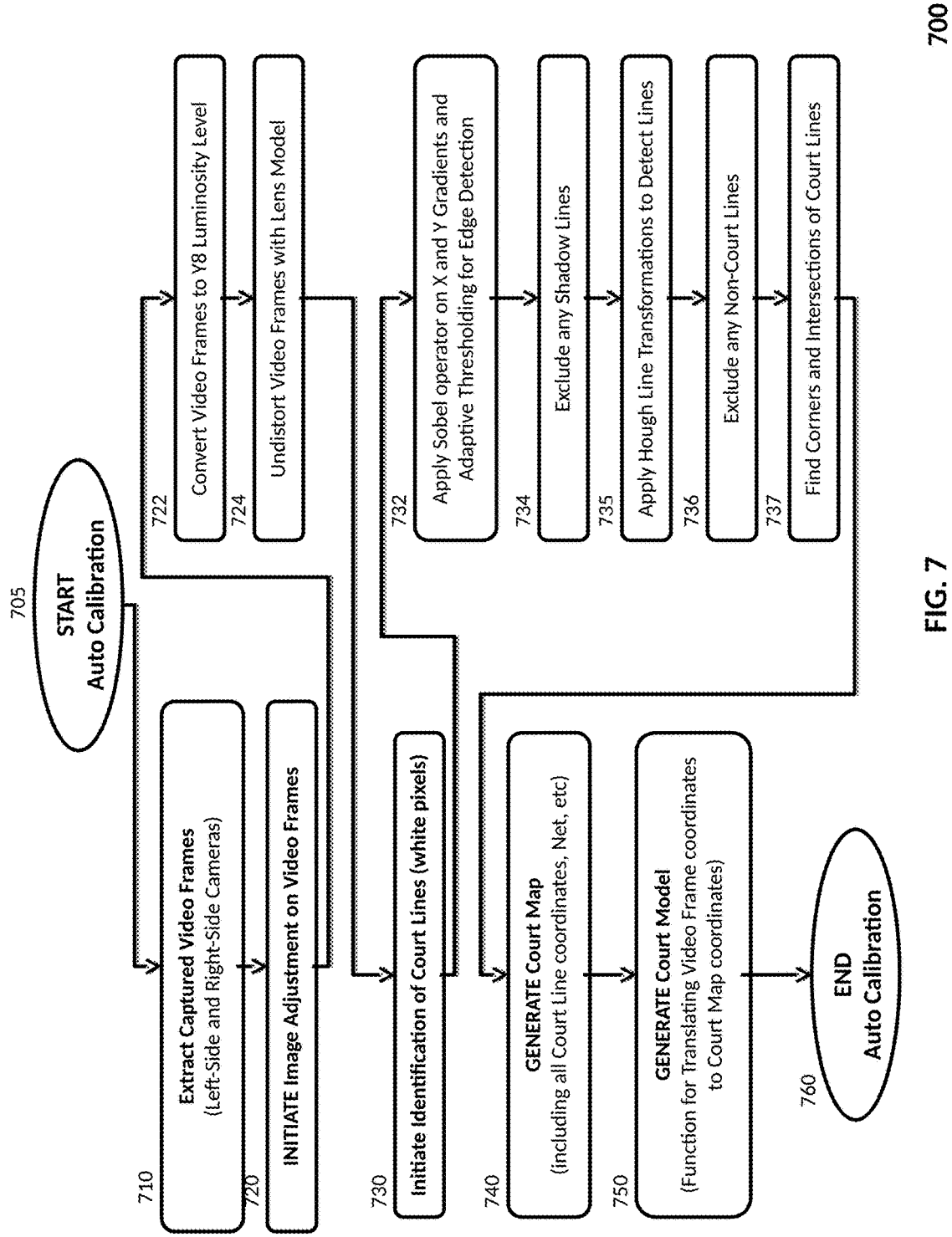
FIG. 7 is a flowchart illustrating key steps performed by an Auto Calibration component of one embodiment of an integrated device of the present invention to generate a court map and a court model that facilitates the translation of individual pixels and object locations on a video frame to corresponding locations on the playing surface of the tennis court represented by the court map.

Turning to FIG. 7, flowchart 700 describes key steps performed by line-calling device 410a during its auto-calibration process. In one embodiment, this process is initiated after line-calling device 410a is attached to one of the net posts of a tennis court. As a result of this process, line-calling device 410a generates the court map and court model to facilitate translations of individual pixels and object locations on a video frame (in particular the tennis court line corners and the tennis ball upon its initial bounce) to corresponding locations on the surface of the tennis court represented by the court map.

Once line-calling device 410a initiates the auto-calibration process in step 705, Video Frame Generator 422b extracts (in step 710) the video frames captured by Camera System 415a (from both left-side and right-side video cameras) for processing. In step 720, Video Image Adjuster 426b initiates an image-adjustment process. In particular, in step 722, it converts the video frames to a Y8 luminosity level to adjust for differences in environmental lighting levels, and then undistorts the video frames, in step 724, to adjust for distortion due to the curved lens in each video camera (based, in one embodiment, on a "lens model" specific to the particular lens employed). Those skilled in the art may employ different image-adjustment algorithms to enable Video Image Adjuster 426b to perform this image-adjustment process without departing from the spirit of the present invention.

In step 730, Line Detector 432b initiates a process consisting of multiple steps to identify the tennis court lines from the video images, including the edges or corners where those lines intersect. This process is facilitated by the knowledge of standard tennis court dimensions.

In step 732, Line Detector 432b applies the Sobel operator on X and Y gradients within the video frames to detect the white pixels of the tennis court lines, also employing adaptive thresholding for edge detection. Line Detector 432b performs a shadow-exclusion algorithm in step 734 to exclude any "false lines" resulting from shadows on the court. Line Detector 432b also employs Hough line transformations commonly used to detect lines on video images. In step 736, Line Detector 432b eliminates any "non-court" lines that are inconsistent with known standard tennis court dimensions (e.g., the fence, adjacent courts, etc.). Finally, in step 738, Line Detector 432b determines the corners of the remaining tennis court lines, again utilizing its knowledge of standard tennis court dimensions. As with the image-adjustment process, those skilled in the art of line and edge detection may employ different algorithms to enable Line Detector 432b to perform this line-detection process without departing from the spirit of the present invention.

Having detected the lines and corners of the tennis court from the video images covering both sides of the court, Court Map Generator 452b, in step 740, generates the Court Map 620, illustrated in FIG. 6 and described above. In particular, as described above, given the known tennis court dimensions—represented in a 3D court map coordinate system 606 ($x_{cm}$, $y_{cm}$, $z_{cm}$)—the lines of the tennis court can be "overlaid" upon the 2D video frame coordinate system 605 ($x_p$, $y_p$).

This is made possible because Line Detector 432b identified the corners 630 of the tennis court on the video frames, enabling these corners to be represented as points in both coordinate systems. Given these known co-planar points (including the known location of the video cameras in Camera System 415a), Court Model Generator 454b generates the court model in step 750, after which the auto-calibration process ends in step 760. Those skilled in the art can employ various different algorithms to effect such a translation (given the locations of a sufficient number of co-planar points on a video frame generated by a single fixed-location camera) without departing from the spirit of the present invention. [See, e.g., "A Simple Algorithm for Object Location from a Single Image without Camera Calibration," Bénallal and Meunier, Computational Science and its Applications, Volume 2667 of the series Lecture Notes in Computer Science, pp. 99-104, Springer, Jun. 18, 2003.]

As noted above, this court model is a function that facilitates the translation of individual pixels and object locations on a video frame to corresponding locations on the playing surface of the tennis court represented by the court map. Note that this translation applies only to pixels and objects that are known to be in the same plane as the surface of the tennis court (i.e., on the ground). As will be discussed below, one such key object is the tennis ball upon its initial bounce (which is separately determined as discussed below with reference to FIG. 10).

Once line-calling device 410a has been attached to a tennis net post, and has completed its auto-calibration process within a few seconds (as described in FIG. 7 above), the players can then, in one embodiment, initiate match play at any time. As will be discussed below with reference to FIG. 9, State Analyzer 470b then tracks the state of the match, and in particular the beginning and end of each point. In other embodiments, line-calling device 410a has additional modes, such as a practice or "free play" mode, in which it makes selective line calls (e.g., limiting line calls to the baseline or a particular service line or sideline) and extracts related statistics.

At the start of each point, before the server puts the ball into play, Player Detector 440b detects each of the players in the video frames generated by the video cameras in Camera System 415a, as described below with reference to player-detection process 800 of FIG. 8. In short, it detects the relative location of the players, enabling line-calling device 410a to identify the server and the target service box (and, in one embodiment, call out the score before each serve), which facilitates the processes of monitoring the "point state" (described below with reference to FIG. 9) and detecting the ball bounce (as described below with reference to FIG. 10).

In step 805, line-calling device 410a initiates the player-detection process. In step 810, Video Frame Generator 422b extracts the video frames captured by Camera System 415a (from both left-side and right-side video cameras) for processing. In step 820, Video Image Adjuster 426b initiates an image-adjustment process, similar to the one described above with respect to auto-calibration process 700 in FIG. 7. It should be noted, however, that the steps of player-detection process 800 are performed continuously while players are moving in between points, as opposed to auto-calibration process 700 which processes static tennis court lines.

In step 822, Video Image Adjuster 426b converts the video frames to a Y8 luminosity level to adjust for differences in environmental lighting levels, and then undistorts the video frames, in step 824, to adjust for distortion due to the curved lens in each video camera (based, in one embodiment, on a "lens model" specific to the particular lens employed).

Then, in step 830, Player Detector 444b detects differences over time among prior video frames so that, in step 840, moving areas can be detected across multiple video frames. In step 850, Player Detector 444b filters these moving areas to isolate the largest ones—i.e., those that constitute tennis players. In this manner, Player Detector 444b determines a player's location on one or more successive video frames (employing Video Frame Selector 424b to select video frames generated by either the left-side or right-side video camera, depending upon the player's location on a particular side of the court).

Figure 9:
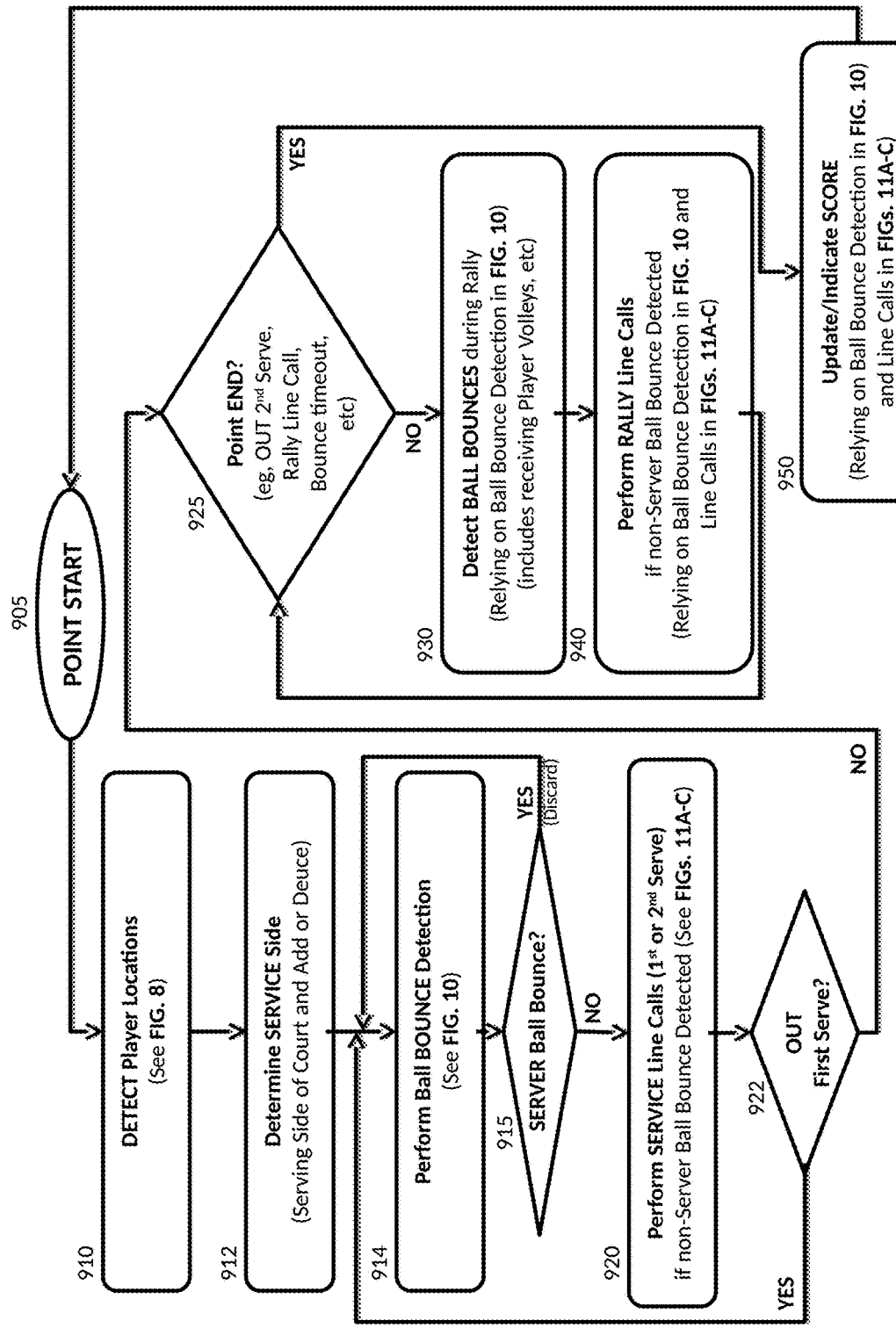
FIG. 9 is a flowchart illustrating key steps performed by a Point State component of one embodiment of an integrated device of the present invention to identify when each point of a tennis match starts and stops and identify relevant lines on the tennis court to facilitate the performance of a Line Calling function by the integrated device.

Player-detection process 800 continues until, in step 855, all players have been detected, at which point, in step 860, Player Detector 444b applies a Kalman filter algorithm to confirm the players' relative locations, ending player-detection process 800 at step 875, and returning to step 912 of FIG. 9. In the event one or more remaining players have yet to be detected in step 855, Player Detector 444b returns to step 810 to invoke Video Frame Generator 422b to extract and process subsequent video frames.

In one embodiment, each player is defined by a bounding rectangle on one or more successive video frames, with the lowest pixels in that rectangle representing the part of the player (i.e., the player's feet) touching the surface of the tennis court. Player Detector 444b then invokes Court Model Translator 482b to translate the locations of the player's feet on a video frame (and on the surface of the tennis court) to corresponding locations on the court map 620.

In this embodiment, each player's location on court map 620 facilitates determination of the players' relative locations in step 912, as described below (e.g., deuce v ad side for server and receiver, including partners for doubles). Such player locations are also utilized, in one embodiment, for various statistics, such as court coverage by each player.

In another embodiment, player-detection process 800 is employed as part of a process to detect player racquets and shot type (e.g., forehand, backhand, etc.). It should be noted, however, that such functionality is relatively CPU-intensive, even if employed relatively infrequently over time.

Those skilled in the art may employ different player-detection and object-detection algorithms to enable Player Detector 444b to perform this player-detection process (e.g., to detect differences among video frames, identify moving areas and identify large objects such as tennis players) without departing from the spirit of the present invention.

Turning to "point-state" process 900 in FIG. 9, which begins in step 905 once each prior point of the tennis match has ended, Player Detector 444b initiates, in step 910, the player-detection process described above with reference to FIG. 8. Once all players have been detected and their relative locations ascertained, control returns to step 912, where State Analyzer 470b determines which player is the server and to which service box (deuce or add side) the serve will be targeted to initiate the point.

In step 914, State Analyzer 470b invokes Ball Bounce Detector 460b to determine when/whether the first or second serve bounces on the playing surface of the tennis court. This bounce-detection process 1000 is described in greater detail below with reference to FIG. 10.

In step 915, State Analyzer 470b determines whether the ball bounce resulted from an actual serve, or merely from the server bouncing the ball prior to serving the ball (a relatively simple determination given the location of the ball bounce). If the server simply bounced the ball before serving, then State Analyzer 470b ignores this bounce and re-invokes Ball Bounce Detector 460b, until eventually a ball bounce resulting from an actual serve is detected. In other embodiments, line-calling device 410a first detects the initiation of the serve itself (e.g., by detecting the intersection between the server's racquet and the ball), thereby eliminating the need to detect these "false bounces."

Once a ball bounce from an actual serve has been detected, Line Call Analyzer 480b is invoked, in step 920, to make the service line call (as described below with reference to FIGS. 11A-11C). Note that, apart from actual ball bounces, it is possible that the served ball leaves the field of view of Camera System 415a and no bounce is ever detected (within a predefined threshold period of time). Other (relatively rare) scenarios include pre-bounce obstacles, including another player's racquet, fence, etc. In such scenarios (though not illustrated in FIG. 9), Line Call Analyzer 480b is not invoked.

In either event, State Analyzer 470b determines, in step 922, whether a first serve has been called OUT or is deemed OUT due to a "timeout" or other non-bounce scenario. If so, control returns to step 914, where State Analyzer 470b again invokes Ball Bounce Detector 460b to determine when/whether the second serve bounces.

Otherwise, State Analyzer 470b determines, in step 925, whether the point has ended. For example, a point ends upon a second serve being called OUT (or a "timeout" in lieu of a bounce), or an unusual scenario such as a serve striking an opposing player. If the point has ended, then Communications module 477b is invoked, in step 950, to update and indicate the score to the players, returning control to step 905 to start the next point.

If, however, Line Call Analyzer 480b determines, in step 925, that the point has not ended (e.g., if a first or second serve is called IN, thereby starting a rally), then State Analyzer 470b invokes Ball Bounce Detector 460b, in step 930, to detect the next ball bounce (or "timeout" or other relevant scenario) during the rally.

Once a rally ball-bounce event has been detected, Line Call Analyzer 480b is invoked, in step 940, to make the rally line call (as described below with reference to FIGS. 11A-11C). Here too, apart from actual ball bounces, it is possible that a ball leaves the field of view of Camera System 415a and no bounce is ever detected (within a predefined threshold period of time), in which case Line Call Analyzer 480b is not invoked, but the ball is deemed OUT. Other scenarios include an opposing player volley, which also obviates the need to invoke Line Call Analyzer 480*b*.

In any event, control then returns to step 925 to determine whether the rally has ended. If not, steps 930 (ball-bounce detection) and 940 (line calls) are repeated until the point eventually ends (e.g., due to an OUT line call), after which Communications module 477*b* is invoked, in step 950, to update and indicate the score to the players, returning control to step 905 to start the next point.

Though not illustrated in FIG. 9, State Analyzer 470*b* (in other embodiments) maintains the state of a tennis match, as well as practice sessions and other predefined scenarios. For example, in addition to monitoring the start and end of each point, State Analyzer 470*b* maintains the game and set score throughout an entire match (or other predefined scoring system for a practice session or similar scenario).

Figure 10:
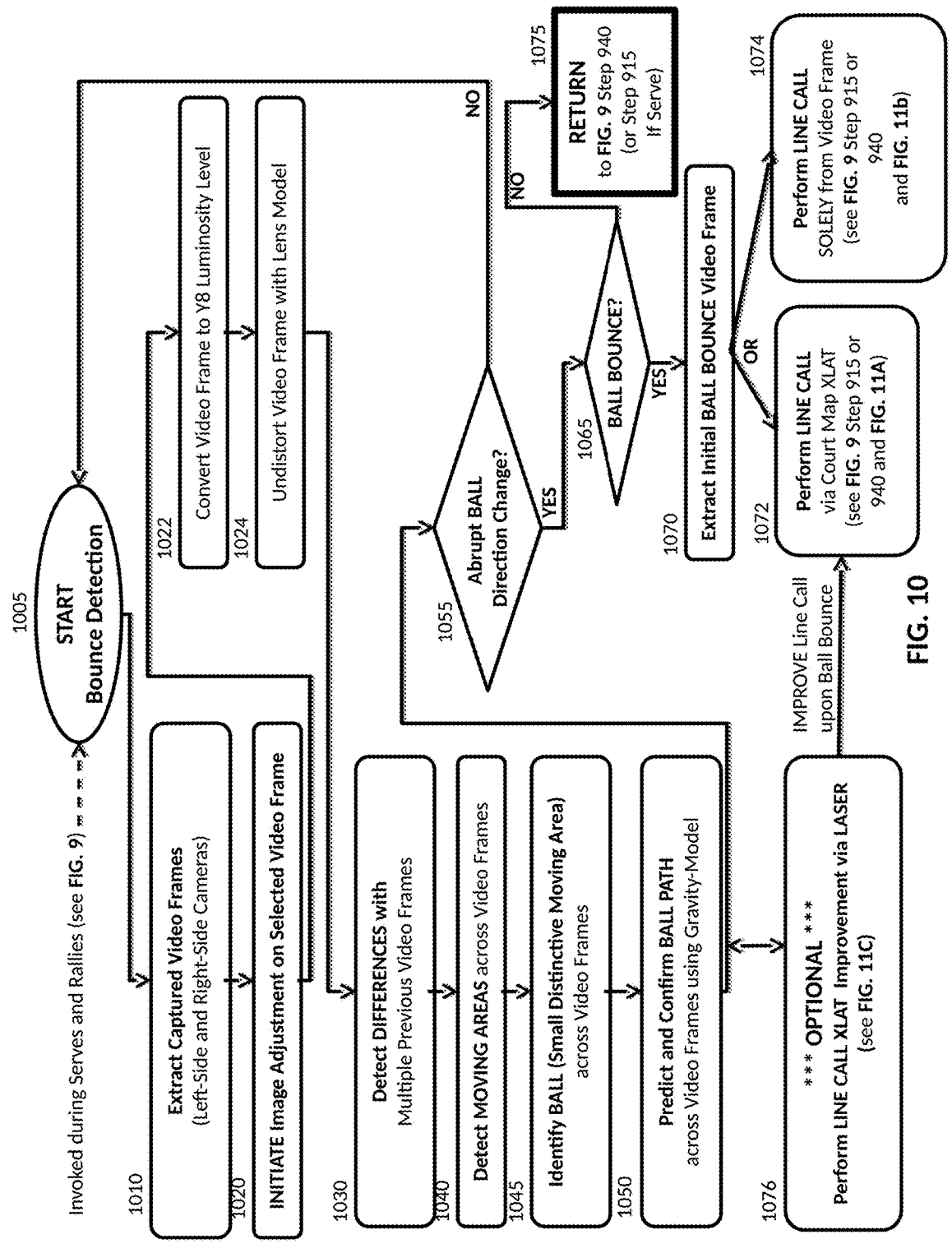
FIG. 10 is a flowchart illustrating key steps performed by a Bounce Detection component of one embodiment of an integrated device of the present invention to identify when a tennis ball bounces on the playing surface of a tennis court.

Turning to FIG. 10, flowchart 1000 describes one embodiment of the ball-bounce detection process referenced above, beginning with step 1005 (invoked during serves and subsequent shots of a rally). As noted above, this bounce-detection process is an important step in the ultimate goal of making line calls.

In step 1010, Video Frame Generator 422*b* extracts the video frames captured by Camera System 415*a* (from both left-side and right-side video cameras) for processing. In step 1020, Video Image Adjuster 426*b* initiates an image-adjustment process that is similar to the one described above (regarding the player-detection process illustrated in FIG. 8) in that it is performed continuously—in this case, while the ball moves across the tennis court. However, because a close-up view of the tennis ball facilitates accurate bounce detection, Video Frame Selector 424*b* selects for image adjustment the video frame generated by the "closer" of the left-side and right-side video cameras. For example, it starts with the server-side video camera, and repeatedly switches to the other camera each time the ball reaches a threshold proximity to the net—i.e., the edge of the video frame.

In step 1022, Video Image Adjuster 426*b* converts the video frame to a Y8 luminosity level to adjust for differences in environmental lighting levels, and then undistorts the video frame, in step 1024, to adjust for distortion due to the curved lens in each video camera (based, in one embodiment, on a "lens model" specific to the particular lens employed).

In step 1030, Ball Detector 442*b* detects differences over time among prior video frames so that, in step 1040, moving areas can be detected across multiple video frames. In step 1045, Ball Detector 442*b* filters these moving areas to isolate small distinctive moving areas that could represent the known shape and size of a tennis ball.

In step 1050, Directional Ball Tracker 462*b* employs a Kalman filter algorithm, based on a gravity model, to predict and confirm the path of the tennis ball over time (across successive video frames). In other words, the path of a "candidate" detected tennis ball moving across successive video frames is confirmed to the extent it is consistent with the path of a tennis ball primarily affected by gravity.

Despite the inability of a single fixed video camera to determine the precise location in 3D space of a tennis ball, the ball's expected trajectory (based on a gravity model) can be compared with its actual trajectory as captured over time on successive video frames (revealing, for example, unexpected changes in vertical direction that are consistent with a ball bounce). Moreover, a gravity model also facilitates the important distinction between a ball bounce and a volley, as will be explained below.

Other environmental factors (e.g., wind) have significantly less effect (between video frames) on the path of a relatively fast-moving tennis ball than does gravity. Apart from speed and gravity, wind is essentially a "third-order" or minimal factor. The use of a gravity model also helps eliminate "false positives" from video noise and other nearby moving objects (e.g., trees or birds).

In one embodiment, an optional external Laser 475*a* is employed to facilitate accurate location of each bounce of the tennis ball (particularly when the tennis ball bounces near a relevant court line, as explained below). In particular, in step 1076 (explained in greater detail below with reference to FIG. 11C), Laser Ball Tracker 464*b* continuously adjusts the angle of Laser 475*a* to track the moving tennis ball until the beam emitted by Laser 475*a* intersects the tennis ball (i.e., confirming a ball bounce), at which point Laser Ball Location Updater 486*b* determines a precise location of the tennis ball on court map 620 and returns control to step 1072 to complete the line-calling process (as described below). In the interim, until a ball bounce is confirmed, control returns to step 1055, as it would if no Laser 475*a* was employed.

In step 1055, Directional Ball Tracker 462*b* determines (from its analysis of successive video frames in the context of the gravity model) whether the ball has experienced an abrupt change in direction. If not (as is normally the case while a tennis ball is in flight after each shot, being affected primarily by gravity), then Directional Ball Tracker 462*b* returns control to step 1005 to repeat bounce-detection process 1000 with respect to successive video frames.

Once Directional Ball Tracker 462*b* determines that the ball has experienced an abrupt change in direction, then it determines, in step 1065, whether the abrupt change in direction is consistent with an actual ball bounce. In other words, by tracking the angle, speed and direction of the tennis ball (even without knowing its precise location in 3D space), Directional Ball Tracker 462*b* can distinguish the path of the tennis ball (primarily affected by gravity) that bounces on the playing surface of the tennis court from alternate paths resulting, for example, from a volley or other collision (e.g., with the body of a tennis player).

In the event the abrupt change in direction is not consistent with a ball bounce, then Directional Ball Tracker 462*b* returns control to FIG. 9 step 940 (or step 915, in the event of a first or second serve) for continued "point state" analysis as described above. For example, with reference to step 925 above, a detected "volley" (or, in one embodiment, a "let cord" during a serve or rally) would result in continuation of the point and a repeat of the ball-bounce detection process per step 930. On the other hand, a detected deflection off the receiving player would end the point (with the receiving player losing the point), while a detected deflection off a fence or other obstacle would also end the point, but in favor of the receiving player.

If, however, Directional Ball Tracker 462*b* determines that the ball has indeed bounced, than Ball Bounce Detector 460*b* extracts, in step 1070, the video frame reflecting the initial ball bounce (e.g., even if subsequent video frames are processed to confirm the ball bounce) and invokes Line Call Analyzer 480*b*.

In one embodiment, Ball Detector 442*b* employs a common computer-vision "template matching" algorithm to facilitate the player-detection and ball-detection processes (e.g., to identify moving areas and identify small distinctive objects such as a tennis ball, a person or a racquet). Those skilled in the art may, however, employ different ball-detection algorithms without departing from the spirit of the present invention.

Once Line Call Analyzer 480*b* is invoked to make a line call, multiple alternative and complementary line-call methodologies may be employed, as are described below with reference to FIGS. 11A-11C.

In one embodiment, Ball Bounce Detector 460*b* invokes Court Model Translator 482*b* to perform, in step 1072, a "court map translation" line call, as described in greater detail below with reference to FIG. 11A. To supplement this method in another embodiment, an external laser (Laser 475*a*) is employed to enable Laser Ball Location Updater 486*b* to obtain a more precise location of the tennis ball when it bounces, as noted above with respect to step 1076 and described in greater detail below with reference to FIG. 11C. In that scenario, this more precise location is utilized by Line Call Analyzer 480*b* to improve its line call (as illustrated by the arrow between steps 1076 and 1072).

In an alternative embodiment, Ball Bounce Detector 460*b* invokes Video Frame Comparator 484*b* to perform, in step 1074, a "video frame comparison" line call (based upon locations within one or more video frames, without translation to corresponding court map 620 locations), as described in greater detail below with reference to FIG. 11B.

In other embodiments, different combinations of these line-calling methods may be employed without departing from the spirit of the present invention. For example, in one embodiment, both "court map translation" and "video frame comparison" line-calling methods are employed. In another embodiment, the selection of one method over the other is based on an estimated "error probability" calculated for each method—e.g., based in part on the "closeness" of the ball bounce location to a relevant line (as estimated from the initial ball bounce video frame).

Figure 11A:
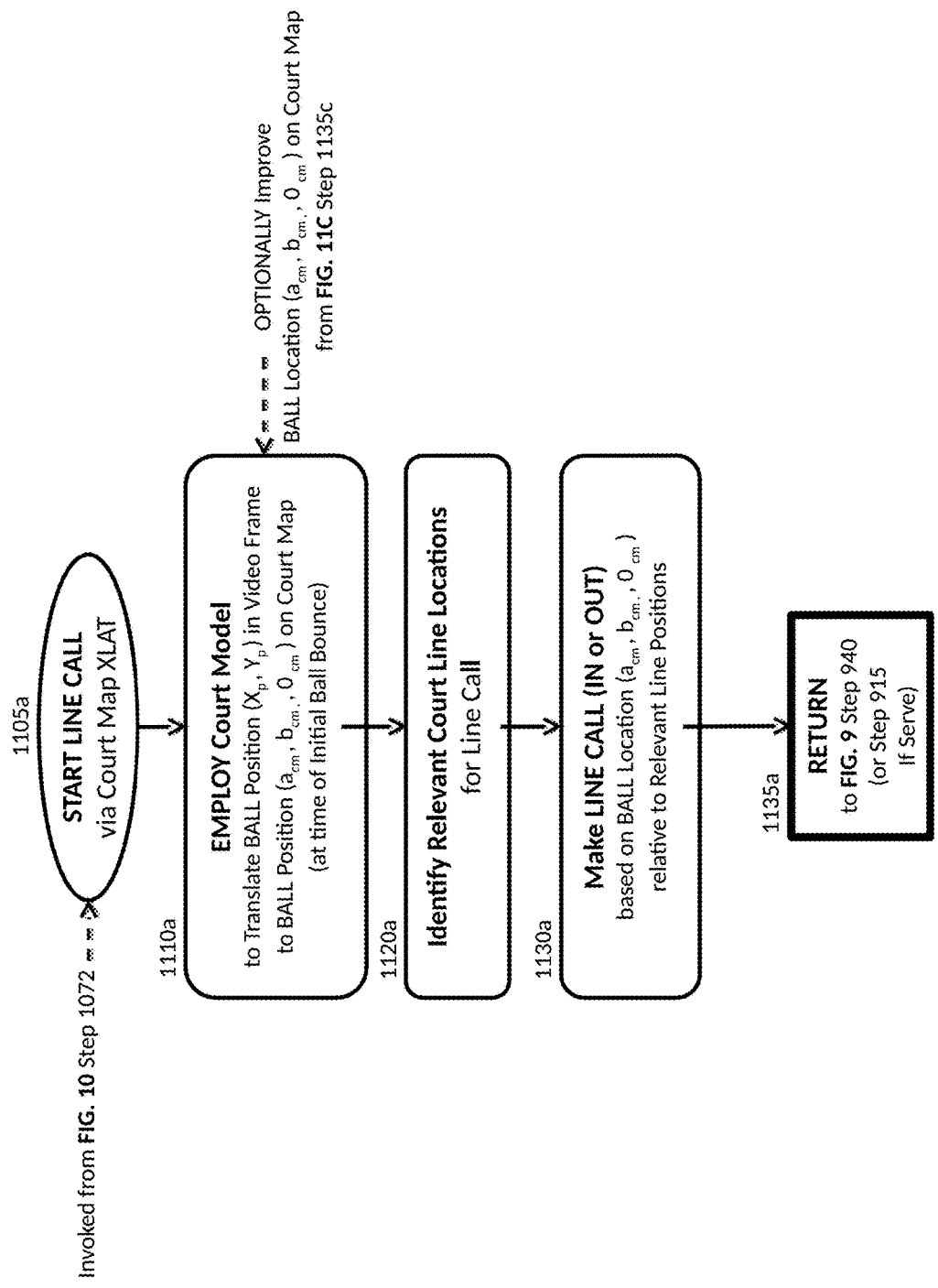
FIG. 11A is a flowchart illustrating key steps performed by a Translation Line Calling component of one embodiment of an integrated device of the present invention, following detection of a ball bounce by the Bounce Detection component of the integrated device.

Turning to FIG. 11A, "court map translation" line-calling process 1100*a* begins with step 1105*a*, upon being invoked by Ball Bounce Detector 460*b* in step 1072 of FIG. 10. Court Model Translator 482*b*, in step 1110*a*, employs the court model function (with respect to the video frame reflecting the initial ball bounce) to translate the ball's location on that video frame to its corresponding location on court map 620.

As noted above, the court model translation may result in some degree of error (in addition to any errors generated during the image-adjustment process) due, for example, to detection of "far-away" pixels at the baseline and far sidelines (relative to the location of line-calling device 410*a*). Such errors are, of course, more significant as the location of the ball bounce is closer to a relevant court line. If Laser 475*a* is present, then the more precise ball bounce location it generates can be utilized, in one embodiment, in lieu of the translated location.

In any event, Line Call Analyzer 480*b* identifies, in step 1120*a*, the relevant court lines. For example, in the event of a serve to the deuce court, the relevant court lines are the three lines of the deuce service box (center line, sideline and service line). In the event of a rally, the relevant court lines are the entirety of both sidelines and the baseline. In other embodiments (e.g., a doubles match), the alley lines are considered as well. Note that the locations of all of the court lines were previously translated to corresponding locations on court map 620 during auto-calibration process 700, described with reference to FIG. 7 above.

In step 1130*a*, Line Call Analyzer 480*b* compares the ball bounce location determined in step 1110*a* to the relevant line locations generated in step 1120*a* to make the line call. For example, in one embodiment, all points on the "IN" side of the relevant court lines (including the court lines themselves) are designated as "IN" points. If the ball bounce location intersects with any of those "IN" points, then the line call is "IN." Otherwise, it is "OUT." Many other similar algorithms may be employed to make the line call (given the locations on court map 620 of the bounced ball and the relevant court lines) without departing from the spirit of the present invention.

Finally, in step 1135*a*, Line Call Analyzer 480*b* returns control to FIG. 9 step 940 (or step 915, in the event of a first or second serve) for continued "point state" analysis as described above. As noted above, the ball bounce location is stored in System Memory 414*a* for use by Communications module 477*b* in communicating shot-location and related statistics and generating associated visualizations.

Figure 11C:
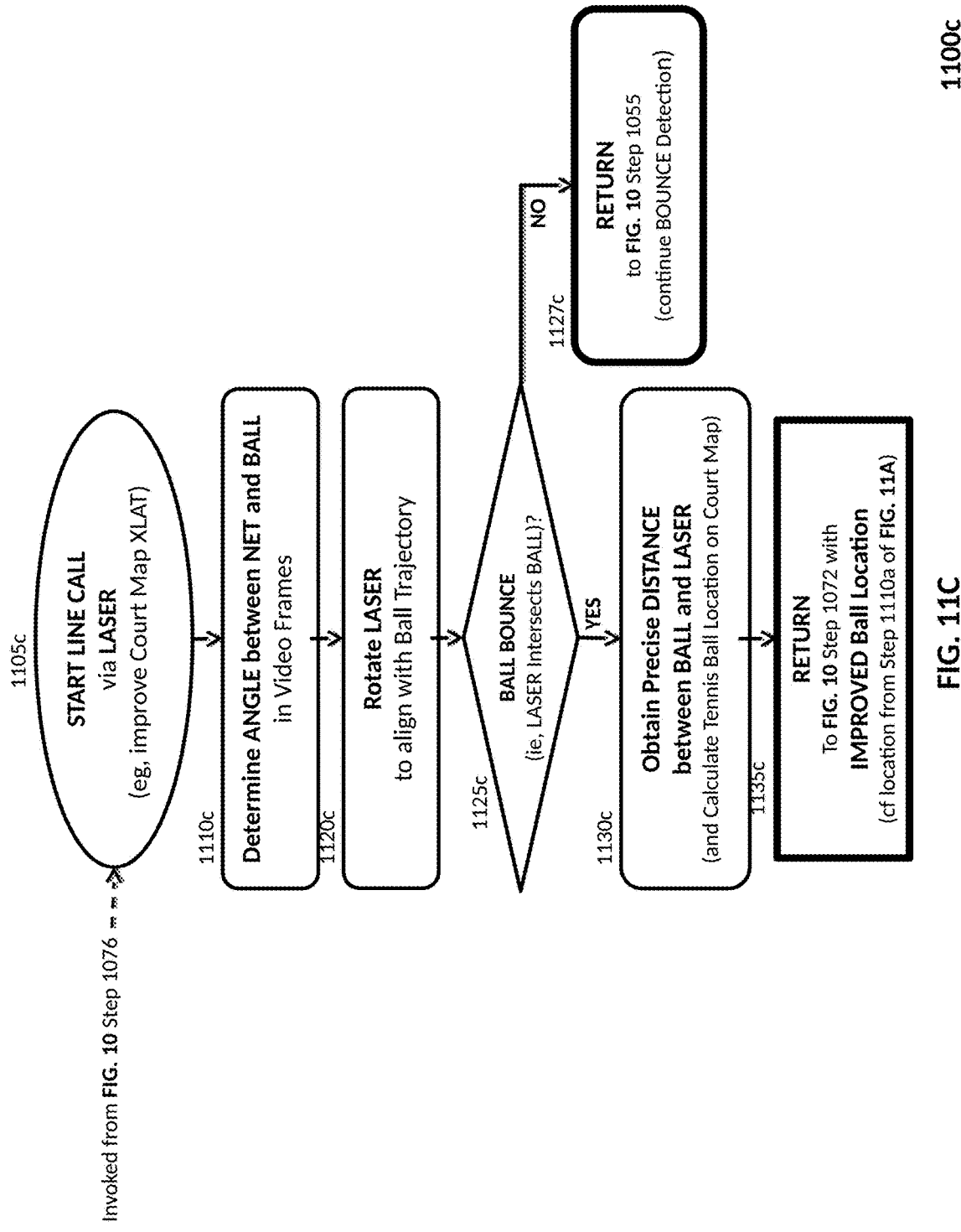
FIG. 11C is a flowchart illustrating key steps performed by an improved Translation Line Calling component of one embodiment of an integrated device of the present invention, employing a laser to follow the trajectory of a ball and more precisely detect its location when it bounces on the playing surface of a tennis court.

Turning to FIG. 11C, flowchart 1100*c* describes one embodiment of a method, starting in step 1105*c*, for calculating a more precise ball bounce location in the event Laser 475*a* is present. As noted above with respect to step 1110*a*, this more precise ball bounce location is utilized by Line Call Analyzer 480*b* (in lieu of the translated location) to improve its line call.

In step 1110*c*, Laser Ball Tracker 464*b* determines (based upon the video frame reflecting the initial ball bounce) the angle between the net (in line with the known location of Laser 475*a*) and the tennis ball. Then, in step 1120*c*, Laser Ball Tracker 464*b* causes Rotation Motor 476*a* to rotate Laser 475*a* to align it with the current location of the tennis ball.

Then, in step 1125*c*, Laser Ball Tracker 464*b* determines whether the beam emitted by Laser 475*a* intersects with the tennis ball (i.e., indicating that the ball has bounced on the playing surface of the tennis court, given that Laser 475*a* is located on the ground). In another embodiment, if the height of Laser 475*a* is slightly above the ground (e.g., one inch), this height is taken into account in determining when the beam is deemed to have intersected with the tennis ball.

If Laser Ball Tracker 464*b* determines that the beam has not yet intersected with the tennis ball (as will normally be the case as the tennis ball is in flight prior to bouncing), then control is returned (in step 1127*c*) to step 1055 of FIG. 10 to continue the bounce-detection process, as described above. In other words, Laser Ball Tracker 464*b* continuously adjusts the angle of Laser 475*a* to track the moving tennis ball until the beam emitted by Laser 475*a* intersects the tennis ball (i.e., confirming a ball bounce).

Once the beam intersects the tennis ball (confirming a ball bounce), then Laser Ball Location Updater 486*b* calculates (in step 1130*c*) the location of the tennis ball upon its initial bounce. Whether employing direct "time of flight" or "phase-based" laser scanning, Laser Ball Location Updater 486*b* determines the distance between the known location of Laser 475*a* and the tennis ball, which in turn yields the location of the tennis ball on court map 620.

Finally, in step 1135*c*, control is returned to step 1072 of FIG. 10 to complete the line-calling process as described above (i.e., by replacing the translated location of the tennis ball with the more precise location calculated by Laser Ball Location Updater 486*b*.

In another embodiment (not illustrated in FIG. 11C), Laser 475*a* is used to obtain a precise location of each corner where court lines intersect, thus enabling process 1100*c* (invoked at step 1076 of FIG. 10) to operate entirely independent of the "court map translation" process 1100*a* in FIG. 11A and the "video frame comparison" process 1100*b* in FIG. 11B. Before invoking the automated pre-calibration process (e.g., prior to the start of a match or practice session), the players place small reflective objects on each corner (e.g., at the intersections of the outer edges of the court lines), enabling Laser 475a to identify these corners and determine precise distances to each corner. In this embodiment, Line Call Analyzer 480b makes the line call (given the known location of the ball bounce and the court lines) without requiring assistance from Court Model Translator 482b (per FIG. 11A) and Video Frame Comparator 484b (per FIG. 11B). In another embodiments, multiple Lasers 475a are employed (e.g., one at each net post) to enable a more precise location of the ball bounce to be determined via triangulation (i.e., the intersection of two circles).

As noted above, in an alternative embodiment (e.g., when Line Call Analyzer 480b determines that the location of the ball bounce on the video frame is deemed sufficiently close to a relevant court line), Video Frame Comparator 484b is invoked to perform a "video frame comparison" (without translation to corresponding court map 620 locations) as described in flowchart 1100b with reference to FIG. 11B, starting in step 1105b.

As noted above, this method has certain advantages over the "court map translation" method, including elimination of some degree of translation errors (which increase as line calls are closer) as well as faster performance, e.g., by avoiding the CPU time required to perform the translations. Moreover, this method also has a lower probability of errors given less distortion in a small portion of the video frame (i.e., the portion of the relevant court lines in proximity to the ball bounce location). The full court line in the video frame, by contrast, has more curvature, and thus exhibits a greater likelihood of error. These advantages, however, are offset by the loss of accurate ball bounce locations, which could otherwise be useful for subsequent statistical analyses and visualizations. The decision as to which method to employ is therefore a tradeoff that those skilled in the art may make differently without departing from the spirit of the present invention.

In any event, in step 1110b, Video Frame Comparator 484b invokes Ball Detector 442b to detect the white pixels of the tennis ball in the video frame reflecting the initial ball bounce. In step 1120b, Video Frame Comparator 484b invokes Line Detector 432b to detect the relevant court lines (see description above of step 1120a of FIG. 11A) in the video frame—as was done for all court lines as described above in step 730 of FIG. 7.

In step 1125b, Video Frame Comparator 484b compares the relative locations of the ball bounce and relevant court lines. In step 1030b, Video Frame Comparator 484b makes the line call. If it can identify on the video frame at least one pixel between the ball bounce location on the video frame and the "OUT" side of any relevant court line, then the line call is "OUT." Otherwise, the line call is "IN." Finally, in step 1135b, Line Call Analyzer 480b returns control to FIG. 9 step 940 (or step 915, in the event of a first or second serve) for continued "point state" analysis as described above.

In addition to the various embodiments of the present invention described above, alternative embodiments will be evident to those skilled in the art without departing from the spirit of the present invention. For example, instead of utilizing a fully integrated line-calling device including video cameras and line-calling functionality, one could attach an existing video camera (such as a "GoPro"® or similar video camera) to a net post (or in proximity to a net post), which transmits recorded video and data to an external smartphone app for line-call and other functionality. Such an embodiment would still fall within the spirit of the present invention in that it retains the "close-up" view of the tennis ball (due to the video camera's proximity to the net post) as well as the line-call functionality based upon satisfaction of an object state condition (ball bounce)—in this case determined from a single fixed-location video camera (even though not integrated into the line-call processing device—i.e., the smartphone).

Finally, it should be noted that many variations of the real-time and post-event statistical and visualization processing described herein and in U.S. Provisional Patent Application No. 62/265,392, which is incorporated herein by reference (whether performed externally or internally by line-calling device 410a) will be evident to those skilled in the art without departing from the spirit of the present invention. These include estimation of ball speed and RPM ("roll per minute") based upon gravity and speed models, AI-based prediction and other algorithms for optimizing player strategy, shot-detection and classification (e.g., offensive and defensive), conclusions derived automatically from statistics (e.g., higher success rate when volleying more frequently against a particular opponent, generally or in particular point scenarios), as well as many other variations.

The invention claimed is:

1. A tennis line-calling system that makes line calls for a plurality of tennis players striking a tennis ball with their respective tennis racquets, causing the tennis ball to move across each side of a tennis court, comprising:
   (a) an integrated tennis line-calling device that includes:
      (i) a camera system that generates successive video frames covering court lines of the tennis court and the tennis ball as it moves across each side of the tennis court; and
      (ii) a line call analyzer that:
         (A) processes the video frames in real time,
         (B) determines when the tennis ball bounces on the playing surface of the tennis court based upon the processing of the video frames,
         (C) determines the location of the tennis ball upon its initial bounce relative to the location of one or more of the court lines of the tennis court, and
         (D) makes a line call based upon the relative location of the tennis ball upon its initial bounce and the one or more court lines of the tennis court;

and
   (b) an attachment mechanism that enables the integrated tennis line-calling device to be attached to or in proximity to a net post of a tennis court.

2. A tennis line-calling system that makes line calls for a plurality of tennis players striking a tennis ball with their respective tennis racquets, causing the tennis ball to move across each side of a tennis court, comprising:
   (a) a video capture device that includes:
      (i) a camera system that generates successive video frames covering court lines of the tennis court and the tennis ball as it moves across each side of the tennis court; and
      (ii) a wireless real-time communicator that wirelessly transfers the video frames in real time to an external tennis line-calling device;
   (b) an attachment mechanism that enables the video capture device to be attached to or in proximity to a net post of a tennis court; and (c) the external tennis line-calling device that includes:
  (i) a wireless receiver that receives the video frames transferred from the video capture device; and
  (ii) a line call analyzer that:
    (A) processes the video frames in real time,
    (B) determines when the tennis ball bounces on the playing surface of the tennis court based upon the processing of the video frames,
    (C) determines the location of the tennis ball upon its initial bounce relative to the location of one or more of the court lines of the tennis court, and
    (D) makes a line call based upon the relative location of the tennis ball upon its initial bounce and the one or more court lines of the tennis court.

3. A tennis line-calling system that makes line calls for a plurality of tennis players striking a tennis ball with their respective tennis racquets, causing the tennis ball to move across each side of a tennis court, comprising:
  (a) an integrated tennis line-calling device that includes:
    (i) a camera system that generates successive video frames covering court lines of the tennis court and the tennis ball as it moves across each side of the tennis court, wherein the camera system includes a single fixed-location video camera covering each side of the tennis court; and
    (ii) a line call analyzer that:
      (A) processes the video frames in real time,
      (B) determines when the tennis ball bounces on the playing surface of the tennis court based upon the processing of the video frames,
      (C) determines the location of the tennis ball upon its initial bounce relative to the location of one or more of the court lines of the tennis court, and
      (D) makes a line call based upon the relative location of the tennis ball upon its initial bounce and the one or more court lines of the tennis court;
  and
  (b) an attachment mechanism that enables the integrated tennis line-calling device to be attached to or in proximity to a net post of a tennis court.

4. An auto-calibration method for a tennis line-calling system that includes a camera system having one or more video cameras that generate video frames covering the lines of a tennis court, the method comprising the following steps:
  (a) extracting one or more video frames generated by the camera system, wherein the video frames cover the lines of a tennis court;
  (b) identifying on the one or more video frames the pixels that constitute the tennis court lines;
  (c) generating a court map based on known tennis court dimensions, wherein the court map represents each corner, where two or more tennis court lines intersect, as both:
    (i) a set of pixels having coordinates in a video frame coordinate system, measured in pixels; and
    (ii) a corresponding set of one or more points having coordinates in a court map coordinate system, measured in units of physical distance;
  and
  (d) generating a court model function that translates pixels from the video frame coordinate system to corresponding points in the court map coordinate system.

* * * * *

US010143907C1

(12) EX PARTE REEXAMINATION CERTIFICATE (11947th)
United States Patent
Gentil

(10) Number: US 10,143,907 C1
(45) Certificate Issued: Nov. 16, 2021

(54) PLANAR SOLUTIONS TO OBJECT-TRACKING PROBLEMS

(71) Applicant: Gregoire Alexandre Gentil, Palo Alto, CA (US)

(72) Inventor: Gregoire Alexandre Gentil, Palo Alto, CA (US)

(73) Assignee: Gregoire Alexandre Gentil, Palo Alto, CA (US)

Reexamination Request:
No. 90/014,623, Dec. 1, 2020

Reexamination Certificate for:
Patent No.: 10,143,907
Issued: Dec. 4, 2018
Appl. No.: 15/370,993
Filed: Dec. 6, 2016

Related U.S. Application Data

(60) Provisional application No. 62/265,392, filed on Dec. 9, 2015.

(51) Int. Cl.
| | |
|---|---|
| A63B 71/06 | (2006.01) |
| H04N 21/218 | (2011.01) |
| G06T 7/254 | (2017.01) |
| A63B 63/00 | (2006.01) |
| A63B 69/38 | (2006.01) |
| H04N 7/18 | (2006.01) |
| A63B 102/02 | (2015.01) |
| A63B 24/00 | (2006.01) |

(52) U.S. Cl.
CPC ........ *A63B 71/0605* (2013.01); *A63B 63/007* (2013.01); *A63B 69/38* (2013.01); *G06T 7/254* (2017.01); *H04N 7/181* (2013.01); *H04N 21/21805* (2013.01); *A63B 2024/0043* (2013.01); *A63B 2071/0611* (2013.01); *A63B 2102/02* (2015.10); *A63B 2220/806* (2013.01); *A63B 2220/807* (2013.01); *A63B 2225/50* (2013.01); *G06T 2207/10016* (2013.01); *G06T 2207/30224* (2013.01)

(58) Field of Classification Search
None
See application file for complete search history.

(56) References Cited

To view the complete listing of prior art documents cited during the proceeding for Reexamination Control Number 90/014,623, please refer to the USPTO's public Patent Application Information Retrieval (PAIR) system under the Display References tab.

*Primary Examiner* — John M Hotaling

(57) ABSTRACT

The present invention overcomes deficiencies of existing line-calling devices by leveraging a single fixed-location camera to identify object state conditions that resolve object-tracking problems that otherwise require multi-camera or moving-camera solutions. Though described in the context of an automated tennis line-calling device, the invention is equally applicable to other object-tracking problems that can be resolved by identifying object state conditions without employing moving or multiple cameras. The tennis line-calling device is attached to (or at least located in proximity to) the net post of a tennis court, thereby enabling a "close-up" view of both static (court lines) and moving (ball, players, etc.) objects. In one embodiment, integration of a video camera system with line-calling functionality provides additional benefits, including attachment of a single turnkey device to any tennis net post so as to provide automated line-calling functionality without the need for any external video cameras or processing functionality.

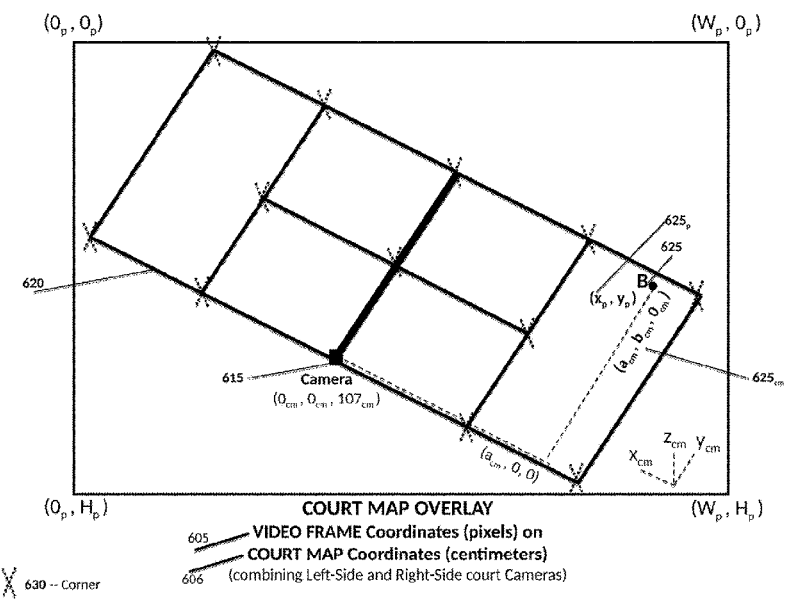

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2 and 4 are cancelled.

Claim 3 is determined to be patentable as amended.

New claims 5-17 are added and determined to be patentable.

3. A tennis line-calling system that makes line calls for a plurality of tennis players striking a tennis ball with their respective tennis racquets, causing the tennis ball to move across each side of a tennis court, comprising:
  (a) an integrated tennis line-calling device that includes:
    (i) a camera system that generates successive video frames covering court lines of the tennis court and the tennis ball as it moves across each side of the tennis court[,]; *wherein the camera system includes a first* [single fixed-location] *video camera covering* [each] *a first side of the tennis court, and a second video camera covering a second side of the tennis court*; and
    (ii) a line call analyzer that, *between successive tennis ball rallies on the tennis court,* operates continuously without receipt of a user input and without a time delay, and further;
      (A) processes the video frames in real time,
      (B) determines when the tennis ball bounces on [the] *a* playing surface of the tennis court based upon the processing of the video frames,
      (C) determines the location of the tennis ball upon its initial bounce relative to the location of one or more of the court lines of the tennis court, and
      (D) makes a line call based upon the relative location of the tennis ball upon its initial bounce and the one or more court lines of the tennis court; and
  (b) an attachment mechanism that enables the integrated tennis line-calling device to be attached to or in proximity to a net post of [a] *the* tennis court.

5. *A tennis line-calling system that makes line calls for a plurality of tennis players striking a tennis ball with their respective tennis racquets, causing the tennis ball to move across each side of a tennis court, comprising:*
  *(a) an integrated tennis line-calling device that includes;*
    *(i) a camera system that generates successive video frames covering all court lines of the tennis court and the tennis ball as it moves across each side of the tennis court; wherein said camera system includes a first lens that captures each point on a first side of the court, and a second lens that captures each point on a second side of the court; and*
    *(ii) a line call analyzer that operates without a user input and without a time delay between successive tennis ball rallies on the tennis court and further;*
      *(A) processes the video frames in real time,*
      *(B) determines when the tennis ball bounces on the playing surface of the tennis court based upon the processing of the video frames,*
      *(C) determines the location of the tennis ball upon its initial bounce relative to the location of one or more of the court lines of the tennis court, and*
      *(D) makes a line call based upon the relative location of the tennis ball upon its initial bounce at any point on the tennis court and the one or more court lines of the tennis court; and*
  *(b) an attachment mechanism that enables the integrated tennis line-calling device to be attached to or in proximity to a net post of the tennis court.*

6. *A tennis line-calling system that makes line calls for a plurality of tennis players striking a tennis ball with their respective tennis racquets, causing the tennis ball to move across each side of a tennis court, comprising;*
  *(a) a video capture device that includes;*
    *(i) a camera system that generates successive video frames covering all court lines of the tennis court and the tennis ball as it moves across each side of the tennis court; and*
    *(ii) a wireless real-time communicator that wirelessly transfers the video frames in real time to an external tennis line-calling device;*
  *(b) an attachment mechanism that enables the video capture device to be attached to or in proximity to a net post of the tennis court; and*
  *(c) the external tennis line-calling device that includes;*
    *(i) a wireless receiver that receives the video frames transferred from the video capture device; and*
    *(ii) a line call analyzer that, between successive tennis ball rallies on the tennis court, operates continuously without receipt of a user input and without a time delay and further;*
      *(A) processes the video frames in real time,*
      *(B) determines when the tennis ball bounces on the playing surface of the tennis court based upon the processing of the video frames,*
      *(C) determines the location of the tennis ball upon its initial bounce relative to the location of one or more of the court lines of the tennis court, and*
      *(D) makes a line call based upon the relative location of the tennis ball upon its initial bounce and the one or more court lines of the tennis court,*
  *wherein said camera system includes a first lens that captures each point on a first side of the court, and a second lens that captures each point on a second side of the court.*

7. *The tennis line-calling system of claim 3, wherein each point of the first side of tennis court is captured by the first video camera from a first side single fixed point of view and wherein each point of the second side of tennis court is captured by said second video camera from a second side single fixed point of view.*

8. *The tennis line-calling system of claim 3, wherein said each of said first video camera and said second video camera has an associated central camera lens axis angled obliquely relative to a longitudinal axis of the tennis net.*

9. *The tennis line-calling system of claim 3, further comprising:*
  *a laser disposed near the tennis court, the laser being configured to emit a laser beam co-planar to the playing surface of the tennis court; and*
  *a laser ball tracker for continually determining, from successive video frames of the video frames, a change in a tennis ball angle relative to a fixed location of the* laser and whether the tennis ball intersects a plane of the laser beam for indicating that the initial tennis ball bounce has occurred on the playing surface of the tennis court.

10. The tennis line-calling system of claim 9, wherein the laser ball tracker is in communication with the laser for determining a 2D location of the tennis ball when the initial bounce of the tennis ball occurs on the playing surface of the tennis court.

11. The tennis line-calling system of claim 5, further comprising:
   a laser disposed near the tennis court, the laser being configured to emit a laser beam co-planar to the playing surface of the tennis court; and
   a laser ball tracker for continually determining, from successive video frames of the video frames, a change in a tennis ball angle relative to a fixed location of the laser and whether the tennis ball intersects a plane of the laser beam for indicating that the initial tennis ball bounce has occurred on the playing surface of the tennis court.

12. The tennis line-calling system of claim 11, wherein the laser ball tracker is in communication with the laser for determining a 2D location of the tennis ball when the initial bounce of the tennis ball occurs on the playing surface of the tennis court.

13. The tennis line-calling system of claim 6, further comprising:
   a laser disposed near the tennis court, the laser being configured to emit a laser beam co-planar to the playing surface of the tennis court; and
   a laser ball tracker for continually determining, from successive video frames of the video frames, a change in a tennis ball angle relative to a fixed location of the laser and whether the tennis ball intersects a plane of the laser beam for indicating that the initial tennis ball bounce has occurred on the playing surface of the tennis court.

14. The tennis line-calling system of claim 13, wherein the laser ball tracker is in communication with the laser for determining a 2D location of the tennis ball when the initial bounce of the tennis ball occurs on the playing surface of the tennis court.

15. The tennis line-calling system of claim 3, wherein the line call analyzer does not track a 3D trajectory of the tennis ball prior to the ball bounce on the playing surface of the tennis court.

16. The tennis line-calling system of claim 5, wherein the line call analyzer does not track a 3D trajectory of the tennis ball prior to the ball bounce on the playing surface of the tennis court.

17. The tennis line-calling system of claim 6, wherein the line call analyzer does not a 3D trajectory of the tennis ball prior to the ball bounce on the playing surface of the tennis court.

\* \* \* \* \*